US011504898B2

(12) United States Patent
 Smeulders

(10) Patent No.: US 11,504,898 B2
(45) Date of Patent: Nov. 22, 2022

(54) METHOD OF THERMOFORMING A FOIL, FORMING TOOL, THERMOFORMING TOOL, INSTALLATION FOR THERMOFORMING, CONTAINER AND BREWING CONTAINER

(71) Applicant: Bosch Sprang BV, Sprang-Capelle (NL)

(72) Inventor: Gijsbertus Adrianus Johannes Baptist Smeulders, Waalwijk (NL)

(73) Assignee: Kiefel GmbH, Freilassing (DE)

( * ) Notice: Subject to any disclaimer, the term of this patent is extended or adjusted under 35 U.S.C. 154(b) by 1 day.

(21) Appl. No.: 15/805,972

(22) Filed: Nov. 7, 2017

(65) Prior Publication Data
 US 2019/0126530 A1 May 2, 2019

(30) Foreign Application Priority Data
 Oct. 27, 2017 (DE) ...................... 10 2017 010 002.0

(51) Int. Cl.
 *B29C 51/08* (2006.01)
 *B29C 51/06* (2006.01)
 (Continued)

(52) U.S. Cl.
 CPC ............ *B29C 51/082* (2013.01); *B29C 51/06* (2013.01); *B29C 51/30* (2013.01); *B65B 43/08* (2013.01);
 (Continued)

(58) Field of Classification Search
 CPC ....... B29C 51/082; B29C 51/06; B29C 51/30; B65B 43/08; B65D 85/8043; B29L 2031/7174
 See application file for complete search history.

(56) References Cited

U.S. PATENT DOCUMENTS 6,315,150 B1  11/2001 Takai et al.
2002/0027308 A1  3/2002 Koppenhofer
(Continued)

FOREIGN PATENT DOCUMENTS

DE  29812475 U1  11/1999
DE  102016201498 A1  8/2017
(Continued)

OTHER PUBLICATIONS

Schwarzmann, Thermoformen in der Praxis- 3., neu bearbeitete und erweiterte Auflage, Illig Maschinenbau GmbH & Co. KG, Robert-Bosch-StraBe 10, 74081 Heilbronn, Germany, 2016 (Year: 2016).*
(Continued)

*Primary Examiner* — Yung-Sheng M Tsui
(74) *Attorney, Agent, or Firm* — Stinson LLP

(57) ABSTRACT

Method of forming, in particular a thermoforming method, a foil into a container, in particular a brewing container, especially a coffee capsule, using a plug assist and/or pressure difference in axial main forming direction, directing the foil into a forming tool creating a blank with a cavity and pressing the foil towards the forming tool bottom in order to create a floor for the blank and characterising the method in that the floor of the blank experiences a material distribution, especially a material shifting and/or material compression, during which a constant pressure difference within the blank's cavity is guaranteed and a circumferential annular gap is created.

20 Claims, 14 Drawing Sheets

(51) Int. Cl.

| | | |
|---|---|---|
| *B65B 43/08* | (2006.01) | |
| *B65D 85/804* | (2006.01) | |
| *B29C 51/30* | (2006.01) | |
| *B29L 31/00* | (2006.01) | |
| *B65B 29/02* | (2006.01) | |
| *B65B 1/02* | (2006.01) | |

(52) U.S. Cl.
CPC .. *B65D 85/8043* (2013.01); *B29L 2031/7174* (2013.01); *B65B 1/02* (2013.01); *B65B 29/022* (2017.08)

(56) References Cited

U.S. PATENT DOCUMENTS

| | | |
|---|---|---|
| 2010/0064899 A1 | 3/2010 | Aardenburg |
| 2011/0041702 A1 | 2/2011 | Yoakim et al. |
| 2016/0255988 A1 | 9/2016 | Rapparini |
| 2016/0280453 A1 | 9/2016 | Accursi |
| 2016/0362246 A1* | 12/2016 | Garcin ............... A23F 5/262 |
| 2017/0174418 A1 | 6/2017 | Cai |

FOREIGN PATENT DOCUMENTS

| | | | |
|---|---|---|---|
| EP | 0 974 263 | A2 | 7/1999 |
| EP | 1163996 | B1 * | 10/2004 ........ B29C 51/343 |
| EP | 1580143 | A1 | 9/2005 |
| EP | 2287090 | A1 | 2/2011 |
| EP | 2394539 | A1 | 12/2011 |
| EP | 2886490 | A1 | 6/2015 |
| EP | 2923969 | A1 | 9/2015 |
| EP | 2966006 | A1 | 1/2016 |
| FR | 1238421 | | 7/1959 |
| WO | 2010/066766 | A2 | 6/2010 |
| WO | 2014/067507 | A2 | 5/2014 |
| WO | 2015/092563 | A1 | 6/2015 |
| WO | 2015/114126 | A1 | 8/2015 |
| WO | 2015/145362 | A1 | 10/2015 |
| WO | 2016/075318 | A1 | 5/2016 |
| WO | 2017/103028 | A1 | 6/2017 |

OTHER PUBLICATIONS

Search Report dated Sep. 19, 2018 relating to German Patent Application No. DE 10 2017 010 002.0, 4 pages.
International Search Report dated May 28, 2019 relating to PCT Application No. PCT/EP2018/000494, 22 pages.
Office Action for European Application No. 18803863.2 dated Jun. 22, 2022, 21 pages.
Peter Schwarzmann, Thermoformen in der Praxis, pp. 179 and 231 and cover/title pages, Published/Copyright 2016, Illig Maschinenbau GmbH & Co.KG, Germany.†

\* cited by examiner
† cited by third party

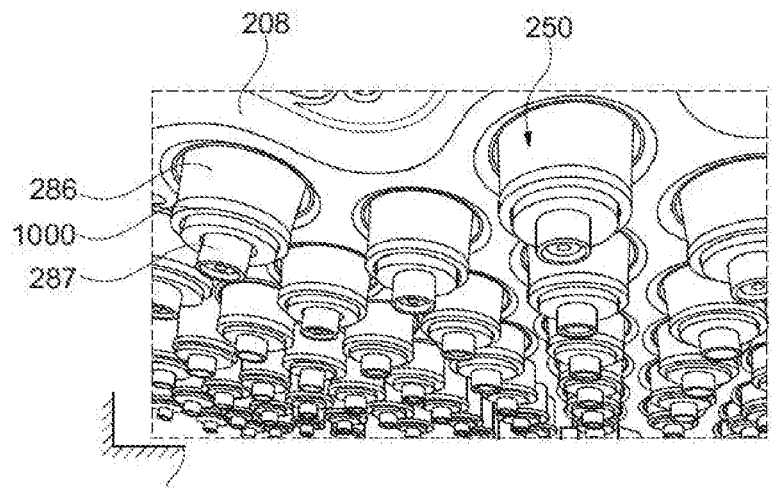
Fig. 11
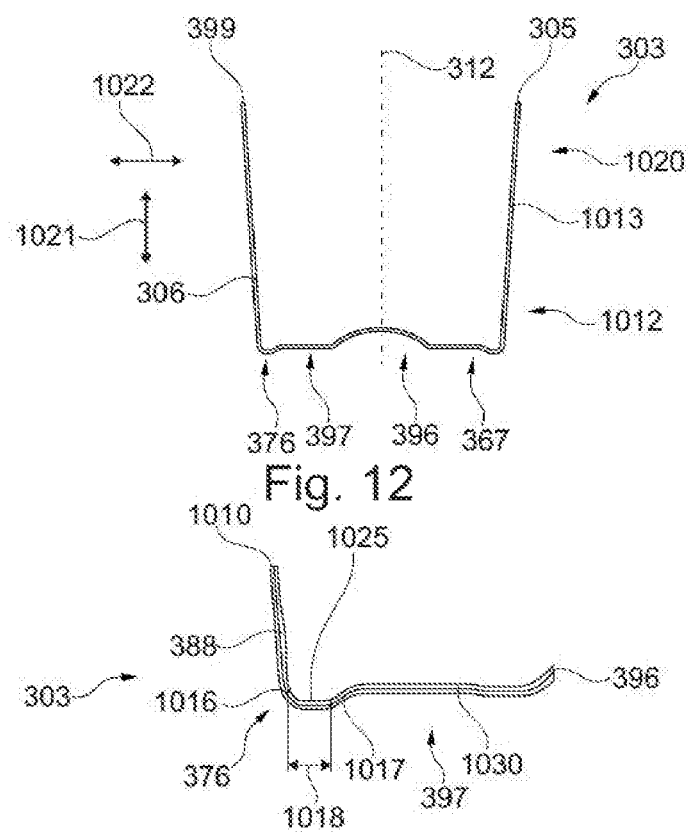
Fig. 12
Fig. 13

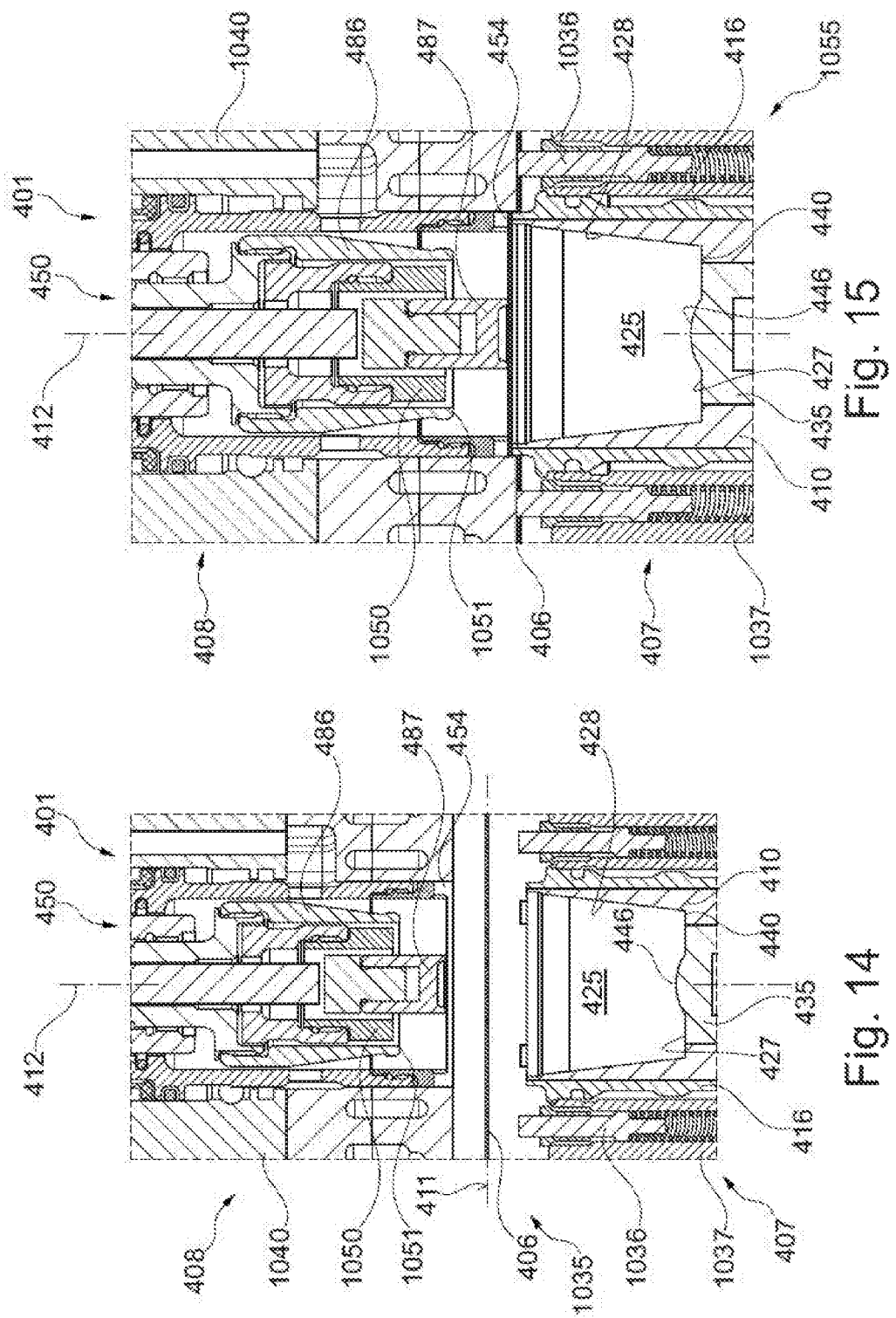

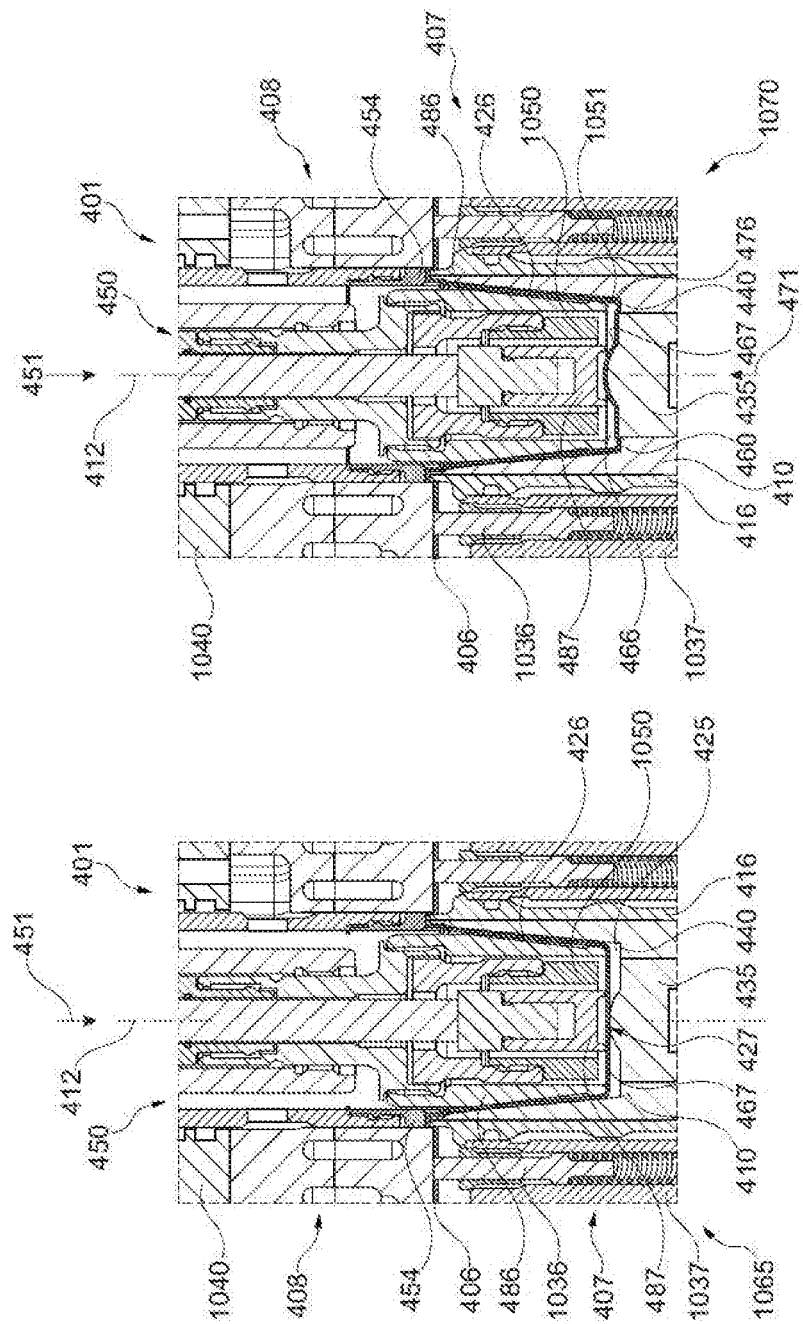

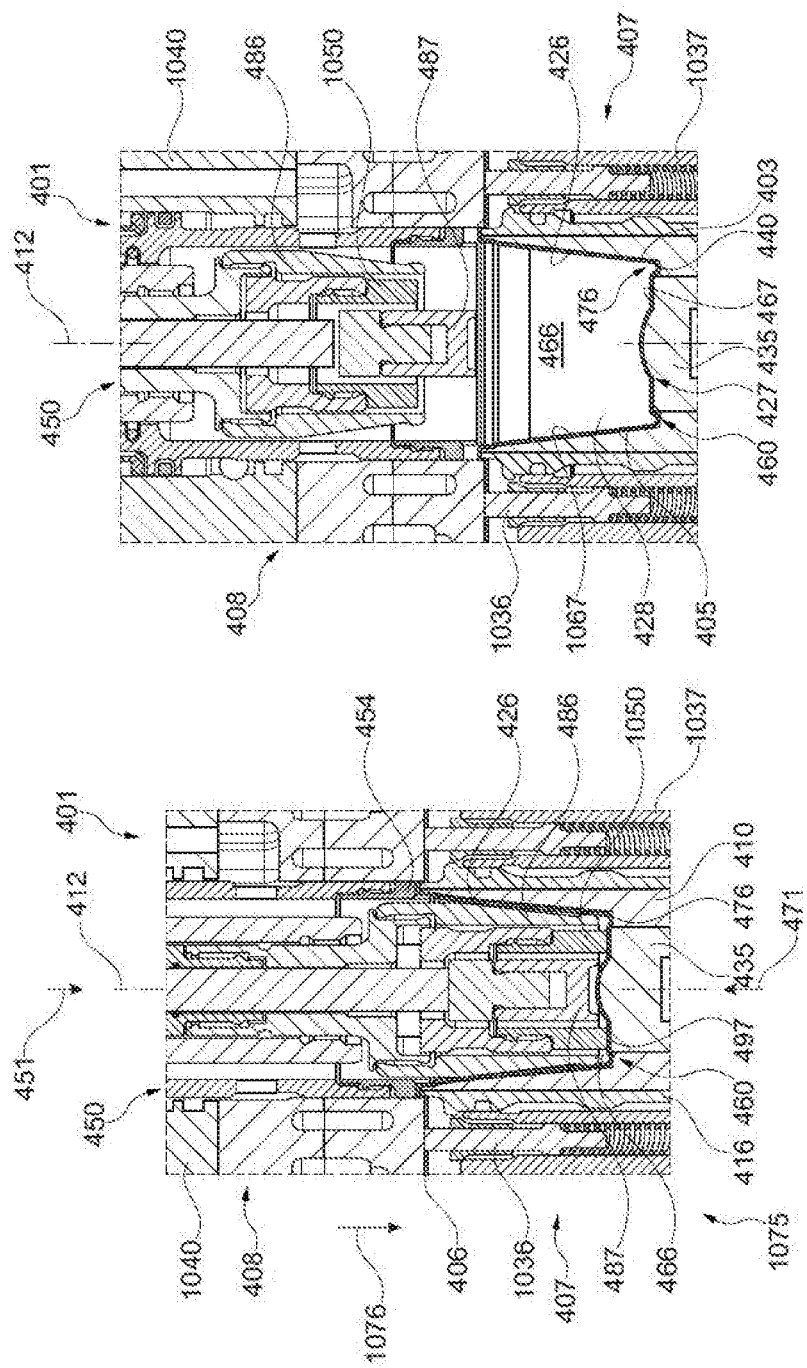

METHOD OF THERMOFORMING A FOIL, FORMING TOOL, THERMOFORMING TOOL, INSTALLATION FOR THERMOFORMING, CONTAINER AND BREWING CONTAINER

CROSS-REFERENCE TO RELATED APPLICATION

The present application claims priority to German Patent Application No. 10 2017 010 002.0, filed Oct. 27, 2017, the entirety of which is hereby incorporated by reference in its entirety.

FIELD OF THE DISCLOSURE

The present disclosure generally relates to containers and methods and apparatus associated with manufacturing such containers, and more particularly to brewing containers and methods and apparatus associated with manufacturing brewing containers.

BACKGROUND OF THE DISCLOSURE

Within this category, methods for forming and in particular thermoforming a foil into a container, brewing container and in particular coffee capsules, are known in the state of art. This also applies for respectively used forming tools and thermoforming tools as well as thermoforming installations, which are installed with previously mentioned tools in order to carry out the previously mentioned methods.

Here, EP 1 541 320 A1 displays a forming tool for deep drawing containers from a heated foil made from thermoplastics. The forming tool possesses an upper and lower part, where the upper part has a down holding element for each forming mould and a movable stretch support within this construction. The lower part has a cooling socket and a cutting ring. The cooling socket is distinguished through a forming insert for the desired container, with a movable forming floor which enables ejection of the finished container. The movable forming floor is plane, in a single piece and has a disk shape. This enables a plane container floor.

Further, EP 1 163 996 B1 defines a method for producing a container from a heated thermoplastic foil and a forming tool for this method. The forming tool has a movable forming floor, with a forming insert and a movable forming floor designed to produce a pedestal. The pedestal is designed as a radially outside lying circumferential annular gap. In order to guarantee a solid pedestal, the forming insert and the movable forming floor are designed to fold the thermoplastic foil at the pedestal in a double layer. This double layer may be squeezed in between the movable forming floor and the shoulder part of the forming insert.

Coffee capsules have developed into a significant mass product, making it of great concern to the producer to produce containers, in particular capsule containers and coffee capsules, in an economical and ecological fashion.

SUMMARY

The invention relates to a method of thermoforming a foil into a container, specifically a container into a brewing capsule, in particular a coffee capsule, where the foil is formed by at least one plug assist and/or at least one pressure difference along the axial main forming direction into a part of the forming tool creating a blank with a cavity, where the foil is subsequently pressed towards the bottom of a forming tool part and thus creating a bottom part to the blank.

The invention further relates to a deep drawing forming tool for a foil into a container shape, specifically a container used as a brewing capsule, in particular a brewing capsule, with a forming chamber part, which can be pressurized, where the forming chamber part has a forming chamber, which is enclosed by a forming tool floor and forming tool wall, so that the forming tool part, in combination with a pressure difference, forms the container.

The invention further relates to a thermoforming tool for thermoforming a foil into a container shape, specifically a container used as a brewing capsule, in particular a brewing capsule, with a forming chamber part, which can be pressurized, where the forming chamber part has a forming chamber, which is enclosed by a forming tool floor and forming tool wall, so that the forming tool part, in combination with a pressure difference, forms the container.

The invention further relates to an installation for thermoforming with a forming tool for deep drawing a foil into a container with a gauge pressure unit.

The invention further comprises a capsule container with a hollow floor containing a centrical space in the middle and a further outside lying base.

The invention further relates to a brewing capsule, in particular a coffee capsule, with a capsule body comprising a hollow floor, which features a centrical space near the middle and a further outside lying base.

The invention further relates to a method for thermoforming a foil into a container, in particular a container for a brewing capsule, specifically a brewing capsule, in particular a coffee capsule, where a foil is formed into a blank with a cavity, within a forming chamber part of a forming tool, along the axial main center line using a plug assist and gauge pressure.

The invention further relates to a forming tool or thermoforming tool for forming a foil into a container, specifically a container used as a brewing capsule, in particular a coffee capsule, with a plug assist and a forming chamber part, in which a forming chamber can be put under gauge pressure, where a plug assist can be inserted in axial main bearing.

BRIEF DESCRIPTION OF THE DRAWINGS

FIG. 11 is a schematic view of a lower part of an upper tool part with a multitude of multi functional plug assists according to FIG. 10;

FIG. 12 is a schematic sectional view of a capsule body of a coffee capsule produced with the help of the multi functional plug assists from FIGS. 10 to 11;

FIG. 13 is a schematic detailed view of the hollow floor of the capsule body from FIG. 12;

FIG. 14 is a schematic of a first sectional display of a thermoforming tool comprising a multifunctional plug assist in an open position, ready for a foil to be applied;

FIG. 15 is a schematic of a second sectional display of the thermoforming tool from FIG. 14 in a closed position with a pre stamped foil;

FIG. 18 is a schematic fifth sectional display of the thermoforming tool displayed in FIGS. 14 to 17 in a third pre-stretching position with an outside plug assist element of the multi functional plug assist at its furthest extension into the forming chamber part;

FIG. 19 is a schematic sixth sectional display of the thermoforming tool shown in FIGS. 14 to 18 during a hollow floor forming stroke under gauge pressure performed by an ejector element and a thus created temporary annular gap;

FIG. 20 is a schematic of a seventh sectional display of the thermoforming tool shown in FIGS. 14 to 19 in a calibration position with a calibration element from the multifunctional plug assist positioned towards the forming floor respectively ejector element;

FIG. 21 is a schematic of an eighth sectional display of the thermoforming tool shown in FIGS. 14 to 20 with a finished blank formed into a container.

DETAILED DESCRIPTION

Figure 1:
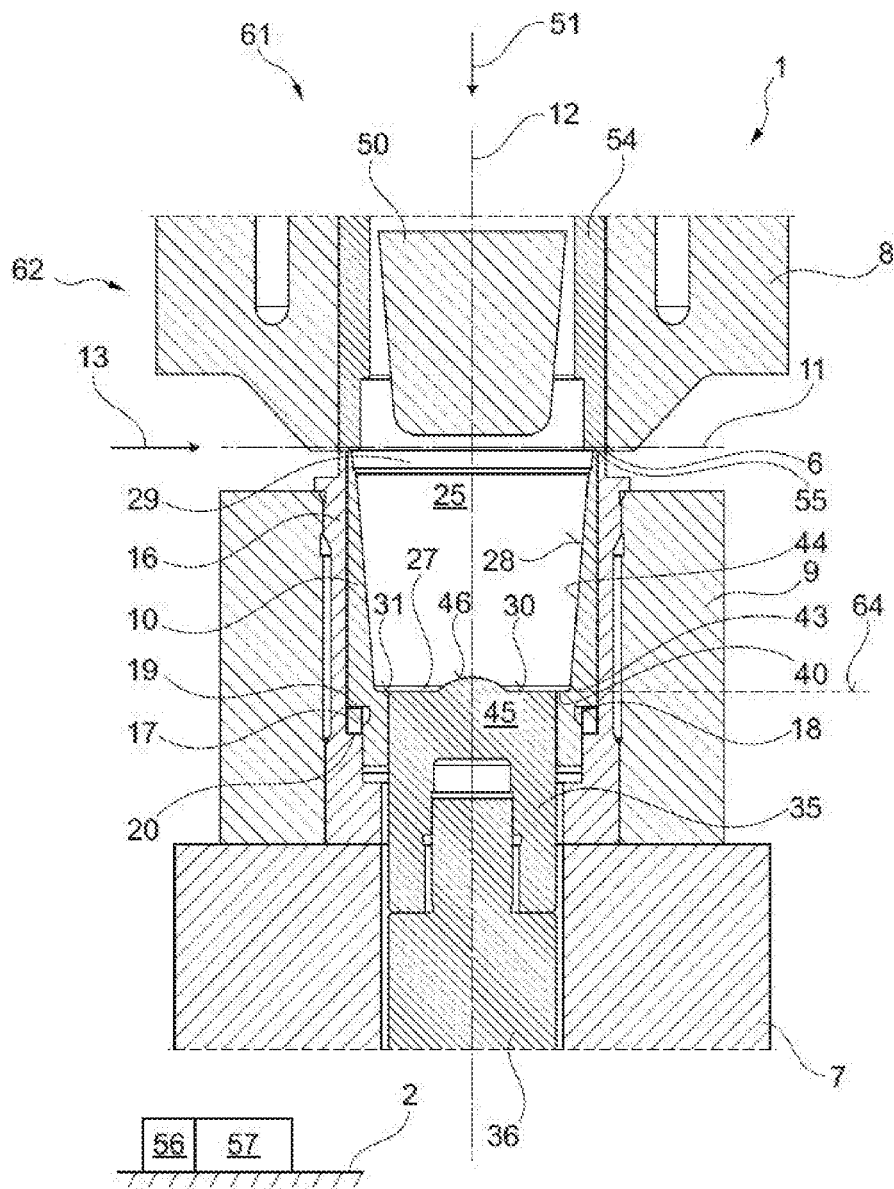
FIG. 1 is a schematic sectional part of a thermoforming tool in a foil pre-stretching position with a foil clamped planely before a forming chamber part.

It is this inventions task, to further enhance methods of this category, especially forming methods, in particular thermoforming methods for forming foils into a container, in particular coffee capsules. One particular aim is to produce a resource conservative method. This method also needs to comprise a simple and reliable tool that is implemented in the process.

The first aspect of this task is solved by a method of thermoforming a foil into a container, specifically a container as a brewing capsule, in particular a coffee capsule, where the foil is formed with a plug assist and/or a gauge pressure, along axial main bearing, in a forming chamber part of a forming tool, into a blank with a cavity. The foil will be pressed towards a forming floor of the forming tool part in order to create a bottom part of the blank, characterizing the method through a further step at the forming floor of the forming tool part which creates a circumferential annular gap at the floor of the blank under gauge pressure, creating a hollow floor at the blanks bottom.

Advantageously, the foil will be formed, under the existing gauge pressure, into the newly formed circumferential annular gap, enabling a hollow floor on the blank of almost any desirable design, creating in a simple process a container with a high structural stability, especially at critical edges.

The terms "forming tool" respectively "thermoforming tool" describe in relation to the invention a shaping tool, which forms a plane given material into a blank or even final product.

A "foil" can be an endless material blank or a premanufactured foil blank. Preferably, thermoplastics are used as a foil.

The term "plug assist" describes a component of a forming tool respectively thermoforming tool, which at least partially bears the foil against a forming chamber and thus at least pre-stretches it.

For Example, the plug assist is placed at or in front of the main entry of the forming chamber as a pre-stretching instrument, and is applied for pre-stretching the foil through the foil level.

The term "forming chamber part" describes in relation to the invention the actual shape of the forming tool, in which the foil is formed into a blank or even a final container product.

The forming chamber part shapes a forming chamber, which is defined by a forming floor and forming side walls. Facing the forming floor is the main entry of the forming chamber. Preferably, the forming side wall is cylindrical, but it can also possess other shapes. Therefore, the forming floor has a circular design, but also other shapes, if the forming side wall is not cylindrical.

The term "blank" describes an at least partially formed foil within the forming chamber part, which may be in a temporary forming condition in the forming chamber part and not yet be a finished container.

The blank has a cavity, which is open towards the plug assist and restricted through a floor section towards at the opposite end.

The term "main bearing" describes the working direction on the forming tool, which forms the foil into the forming chamber part. Presently, the main bearing, viewed from the main entry, runs towards the forming floor.

The term "annular gap" describes a condition during the forming process which temporarily occurs at the forming tool respectively at the forming chamber part, in particular at the forming floor. It occurs in form of a circumferential groove which is open towards the forming chamber, enabling an expansion of the forming chamber part respectively the forming chamber.

In other words, the annular gap only occurs as a requirement at the forming tool respectively the forming chamber.

Insofar, at first, during the entire forming process, the annular gap may only be developed in a very unnoticeable scale, or not at all, so that a plane forming space of the forming chamber part is present at a defined first height.

This annular gap may be produced in different ways, which will be explained later in this text.

The terms "floor space" respectively "hollow floor" are, in relation to the invention, designed to be opposite to the main entry of the blank, which will later be formed into a container, respectively a capsule body for a brewing capsule, specifically a coffee capsule.

A hollow floor may also be defined especially through a concentrically running base around a rotational center line, which extends beyond the blank respectively the produced container or capsule body.

The circumferential base is formed through a curved foil part, which in closer observation displays, on a cross section, two foil sections at a distance to each other. This means, two foil sections are facing each other with no contact.

This means a cavity of the blank container respectively capsule body extends towards the two foil sections defining the circumferential base.

The distance separating these two foils is at least 0.5 mm, preferably more than 1 mm. Further, the distance should be less than 5 mm.

According to a preferred set up this distance should be approximately 2 mm.

Figure 9:
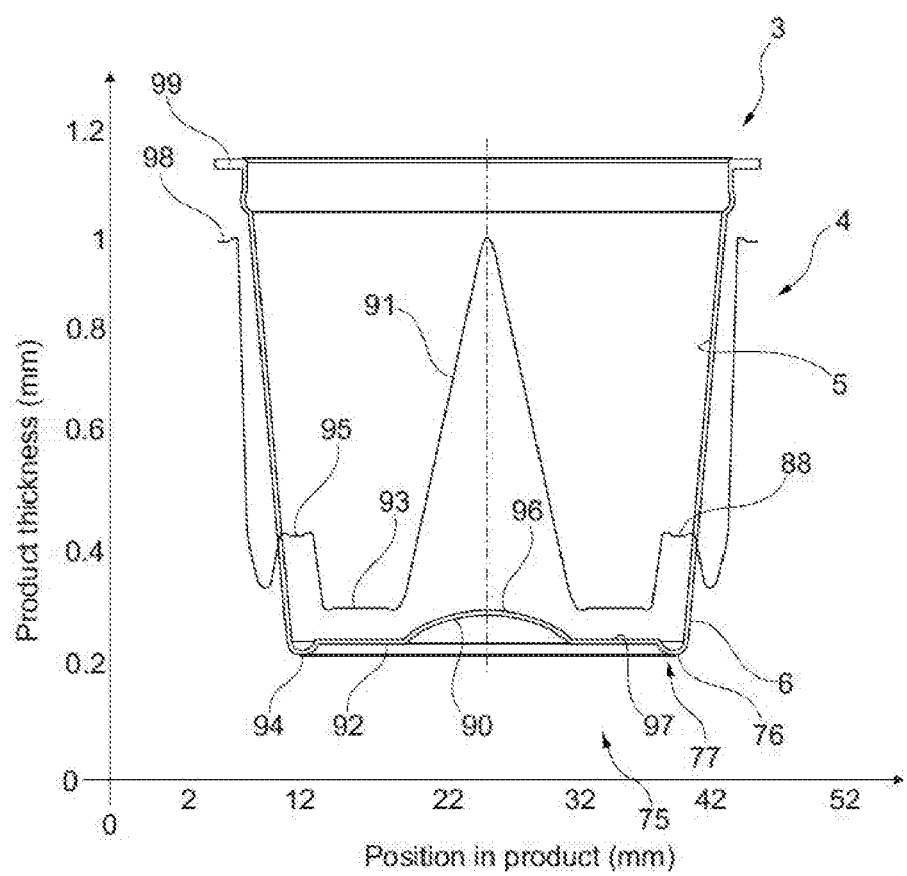
FIG. 9 is a schematic sectional view of a capsule body of a coffee capsule with a plotted material peak on the capsule body.

Naturally, the circumferential base may possess further characteristics in addition or separately, e.g. different material strength, also in surrounding areas, which is also shown in FIGS. 9, 12 and 13.

In any case, the product (blank, container, capsule body) receives a further stabilizing characteristic with a circumferential base as well as good machine operability with a clearly formed structure, e.g. automated coffee dispensers.

In particular, among constantly growing numbers of brewing—respectively coffee capsules, a circumferential base is observed, guaranteeing a solid structure. This may enable good visibility of data displayed on top of these bodies.

Often, coffee capsules either "stand" or "lie" on these closures, hiding any given data on these parts.

Contrary to this hollow floor the current floor is mainly plane and only differentiable through a dished center section (coffee capsule).

Presently, the current floor section respectively hollow floor may represent either a top part or a foot part of a produced capsule body.

The second aspect of this task is solved by a method of thermoforming a foil into a container, specifically a container as a brewing capsule, in particular a coffee capsule, where the foil is formed with a plug assist and/or a gauge pressure, along axial main bearing, in a forming chamber part of a forming tool, into a blank.

The foil will be pressed towards a forming floor of the forming tool part characterized in that during gauge pressure within the cavity of the blank the forming floor of the forming tool at least partially exerts a hollow floor stroke of less than 5 mm or less than 3 mm, preferably less than 2 mm or less, towards the main bearing in order to create different floor thickness on the floor of the blank, which is surrounded by a circumferential base.

Naturally, the existing annular gap may be produced constructively in different methods, which was previously explained. The third aspect of this invention handles a material distribution, under gauge pressure, by exerting a hollow floor stroke with the forming floor of the forming tool part.

The term "material distribution" explains in relation to the invention an increase or decrease of thickness of the single layer foil, respectively a single layer foil material, especially through compression, stretching or upsetting.

Here the forming floor is moved, less than 5 mm, towards the main bearing and the gauge pressure within the cavity of the blank.

This in particular enables the creation of different floor thicknesses on a floor of a blank surrounded by a circumferential base. This may be useful when a defined center are is desired.

It was observed that a limited "hollow floor stroke" is a reliable process and easily constructable when it comes to producing different floor thicknesses on a blank. This is very appreciated regard a general desire to save as much material during the process as possible.

This also allows to apply more material to import areas, which guarantee structural stability, e.g. of a capsule body, and reduce the amount of material in areas seen not as important to overall structural stability.

It was recognized, that it is sufficient to have an initial movement, of a few millimeters, of the forming floor, in order to design different floor thicknesses on the blank.

The term "hollow forming stroke" describes a forming movement of the forming tool, where the forming floor of the forming tool at least partially, respectively a part of the forming floor, moves, or lifts, towards the main bearing, or forming direction.

Insofar, in relation to the present invention, a movement towards, in other words against, the main forming direction, or bearing, occurs. The objective is to further form the blank, in particular the cavity of the blank, during the process. In particular, different floor thicknesses, lying radially further inside, with a floor circumferenced by a base, can be created.

This invention solves the task in a third aspect with a method of thermoforming a foil into a container, specifically a container as a brewing capsule, in particular a coffee capsule, where the foil is formed with a plug assist and/or a gauge pressure, along axial main bearing, in a forming chamber part of a forming tool, into a blank with a cavity. The foil will be pressed towards a forming floor of the forming tool part characterized in that at the floor of the blank a material distribution, in particular a material shift and/or a material compression, occurs by creating an annular gap at the forming floor, during gauge pressure within the cavity.

During this material distribution a worthwhile material saving can be obtained. This is of particular concern when the end product competes in a global mass market, like the market for coffee capsules.

It is further advantageous, to create different areas, or regions, of use on the blanks floor, using an annular gap.

It is therefore recognized, that the annular gap, created at the forming floor of the forming tool part, supports a material distribution on the floor of the blank, as the foil can be formed into this annular gap. This affects the total material distribution on the blanks floor. In particular, in a procedural perspective, it is very simple to create a hollow floor on the floor of the blank, using this method.

It is advantageous for all aspects of this invention, if the application of an annular gap and/or hollow forming stroke create at least one material peak and/or at least one material depression at the blank's floor. This enables the design of a circumferential base (material peak) in order to stabilize the product, but also a material reduction (material depression).

A preferred variant of this method regarding the mentioned aspects of this invention envisages, the creation of different floor thicknesses on the floor of the blank, using gauge pressure in the cavity of the blank and the publication of an annular gap at the forming tool's part forming floor. The process lead may be chosen so that the additional forming of the foil into the newly created annular gap results in a material distribution which directly affects the thickness of different parts of the floor of the blank.

It is also advantageous, if the floor of the blank possesses a disk like area lying radially further inside with a first thickness, a radially further outside lying floor ring area with a second thickness and a radially even further outside lying floor ring section with a third thickness; and these are created, during gauge pressure within the cavity of the blank, by an annular gap. This enables, in a simple procedural perspective, the creation of different functional areas on the floor of a blank.

For example, the radially inside lying disk like floor section defines the actual center of a coffee capsule. The radially further outside lying second floor ring represents a pedestal of the coffee capsule, preferably in form of a circumferential base at the floor.

Insofar a preferred variant includes, using the radially inside lying disk like floor in order to create a plane, or preferably a dished, thicker center area on the floor of the blank.

The inner center of this center area on the blank may be further enhanced, in particular stabilized, using the forming floor on the forming tool part, by forming the area into the cavity of the blank.

It is especially useful, if the second, radially further outside lying, floor ring area is designed as a circumferential base on the floor of the blanket, giving the end product, among the other functions on the floor, an advantageous pedestal.

If the radially further outside lying first floor ring area is used for creating a punctuation section between the radially inside lying disk like floor area and the radially further outside lying second floor ring area, the production of coffee capsules can be designed in a more economical sense.

The radially outside lying, first floor ring area, will then be located between the disk like floor area and the second floor ring area. This are has no further use and only serves as a connection between the other two and may therefore have a thinner material thickness as other areas on the floor.

This invention solves the task in a fourth aspect with a method of thermoforming a foil into a container, specifically a container as a brewing capsule, in particular a coffee capsule, where the foil is formed with a plug assist and/or a gauge pressure, along axial main bearing, in a forming chamber part of a forming tool, into a blank with a cavity. The foil will be pressed towards a forming floor of the forming tool part characterized in that, under gauge pressure in the cavity of the blank, an annular gap is created at the forming floor of the forming tool part, into which the foil can be formed along the axial main bearing, in order to create a circumferential base at the floor of the blank.

This fourth aspect of the invention and its procedure, a circumferential base at the floor of the container, especially a coffee capsule, can be designed, in a simple procedural perspective, and used within preferred applications as a pedestal.

This circumferential base is used preferably radially outside and forms directly into a side wall of the blank, respectively container. Naturally the circumferential base may also be located at a radially more inside lying position, if desired.

The circumferential base may be continuous or separated by gaps.

Therefore, this inventions allows the creation of a circumferential base on a container, respectively brewing capsule or coffee capsule, at a much lower material cost than is currently possible. This was previously explained in a more detailed fashion.

The annular gap on the forming floor used in this method, may be created, using a ring like floor part on the forming floor of the forming tool part, and lowering it along the main axial bearing, but also leaving a circular part of the forming floor stationary. This variant may not be as appropriate as desired, as it leaves the foil forming into the gap with a force except the gauge pressure on it. This only allows a limited material distribution.

This invention solves the task in a fourth aspect with a method of thermoforming a foil into a container, specifically a container as a brewing capsule, in particular a coffee capsule, where the foil is formed with a plug assist and/or a gauge pressure, along axial main bearing, in a forming chamber part of a forming tool, into a blank with a cavity. The foil will be pressed towards a forming floor of the forming tool part characterized in that, under gauge pressure in the cavity of the blank, the forming floor of the forming tool part at least partially exerts a hollow floor stroke of less than 5 mm or 3 mm, preferably 2 mm or less, towards the main bearing, in order to create an annular gap at the forming floor of the forming tool part, in order to create a circumferential base at the floor of the blank.

In a procedural perspective, it is very simple to realise an annular gap, if at least part of the forming floor exerts an initial stroke towards the main bearing, which has a stroke length of only 5 mm or 3 mm, preferably 2 mm, or less. This already guarantees a sufficient annular gap in the forming tool part, on which the foil can be formed under gauge pressure.

Occurs a hollow forming stroke against gauge pressure within the cavity of the blank, meaning against the main bearing, a very good material spread of the foil can be reached.

Further, the floor part of the forming can be designed with precise contours, if an annular gap is created on the forming floor of the forming tool part and if the cavity of the blank experiences gauge pressure.

The invention also comprises that the annular gap is produced during gauge pressure in the cavity of the blank, and the hollow floor forming stroke is performed during gauge pressure in the cavity of the blank. It was verified that the foil can be manipulated especially well under gauge pressure in the cavity of the blank.

The gauge pressure in the cavity of the blank may occur before, during and after the creation of an annular gap and/or hollow floor forming stroke.

However, the procedures can be performed very effectively, if an annular gap and/or a hollow floor forming stroke occur under already existing gauge pressure, which has already been used for pre-forming the foil, respectively the blank.

It is convenient if the creation of an annular gap along the main bearing increases the volume of the cavity of the blank, or at least leaves it unaffected. Therefore the transport volume of the final product either advantageously increases or stays the same.

It is especially advantageous that even though the hollow floor forming stroke towards the main bearing occurs, a greater volume of the blank, or at least unaffected volume, can be effected.

A container respectively capsule body of a brewing capsule can be designed especially well, if the cavity of the blank is enhanced with a circumferential base. This allows an increase of, or at least an unaffected, payload for the container, although a new form with the circumferential base has been added.

If the designed circumferential base is single walled, the quantity of used material is very low. This is of particular concern with mass products like coffee capsules.

In relation to the invention, single walls are defined through an existing cavity of the blank, respectively container, between single foil layers.

In other words, two foil layers are separated by any volume of the cavity of the blank.

Also, it is very convenient, if the annular gap and/or the hollow floor stroke are performed with a distance of less than 10% or less than 5% of the total height of the blank, the container or a capsule body; and of at least 1% of the total height of the blank, the container or a capsule body. This allows the creation of a hollow floor depth of 2 mm or less in a simple procedure. This in return allows very good material distribution, respectively a circumferential base.

The presented methods can be carried out with few controlling steps if an annular gap height and/or hollow floor stroke are pre-set.

However, the methods may easily be adjusted to any customer desire, if the annular gap height and/or hollow floor forming stroke are set variably.

The production of the present containers may be further enhanced, if in the link-up to the hollow floor forming stroke an additional ejector stroke from the forming floor occurs in order to eject the product from the forming tool.

The task of the invention is also fulfilled by a forming tool for deep drawing a foil into a container, especially a container used as a brewing capsule, in particular a coffee capsule, with a forming tool part, which can be put under pressure, and which comprises a forming chamber which is contained by a forming chamber floor and a forming chamber wall, in such a way that the forming chamber part can, under gauge pressure, form a foil into a container, where the forming tool is designed to produce an annular gap at the forming chamber floor, under gauge pressure, into which the foil may be formed.

This annular gap, which is created during the running forming process at the forming chamber, allows a particularly good material distribution, which also enables the creation of a circumferential base at the blank, respectively a pedestal on the container.

The task of the invention is also fulfilled by a thermoforming tool for thermoforming a foil into a container, especially a container used as a brewing capsule, in particular a coffee capsule, with a forming tool part, which can be put under pressure, and which comprises a forming chamber which is contained by a forming chamber floor and a forming chamber wall, in such a way that the forming chamber part can, under gauge pressure, thermoform a foil into a container, where the forming tool is designed to produce an annular gap at the forming chamber floor, under gauge pressure, into which the foil may be formed.

In particular, the already formed, respectively preformed floor area of the blank, is further enhanceable into the annular gap.

It is further advantageous if the forming floor possesses a movable ejector element which can be extended into the forming chamber and which is enclosed by a stationary floor ring element. Ejecting this element into the forming chamber, the annular gap can be very easily created constructively and in a procedural perspective.

Naturally, the floor ring element may be separately or synchronically moved relative to the forming chamber.

A constructively simple version comprises a stationary floor ring element, relative to the forming side walls.

The floor ring element can be easily designed at the forming chamber part, if the floor ring element is a single piece design towards the forming chamber side walls.

If the ejector element has a smaller diameter than the forming floor, the annular gap can be easily implemented between the forming chamber wall of the forming chamber part and the ejector element.

It is further advantageous, if the ejector element has a height equal to or higher than the desired annular gap. This allows the ejector element itself to form a natural radially inner lying border. Therefore the construction effort for the tool is relatively low, although an annular gap is implemented in the design.

If the ejector element is a single piece, it is easier to implement it as a component of the tool.

If the ejector element is, at least at its upper part, partially assisted by the circumferencing floor ring element, additional bearings within the tool can be spared. This also makes the constructive effort agreeable.

Naturally, the surface of the ejector element, which at least partially serves as part of the forming floor, can be designed in any way. This allows the easy creation of any contour on the floor of the blank.

If the ejector element has a convex shape at its head side, the central are of the blank can be designed especially favorable.

The term "head side" in relation to this invention is part, especially an end, of the ejector element, in particular the part facing the forming chamber under gauge pressure.

In order to produce an annular gap and its height even easier, and also more versatile, it is advantageous if the forming chamber part can be adjusted in its height, relative to the ejector base and/or a forming chamber mount.

The adjustable height may be constructed in many ways.

One way is a screw connection which allows the forming chamber part to adjust its height, within the forming chamber mount, relative to the ejector element.

A very easy constructive measure for this height manipulation are different distance rings used for the annular gap. Here, at least one distance ring is used in a reception room between the forming chamber part and a forming chamber part mount. In particular between an upper shoulder of the forming chamber part and a lower shoulder of the forming chamber part mount.

It is further advantageous, if the forming tool or the thermoforming tool possess a plug assist, used for forming the foil, facing the forming floor. This enables work on the foil independently from any pressure difference, e.g. stretching and pre forming.

Using the previously described methods and forming tools an already improved production of containers for brewing capsules, for example coffee capsules, is possible. Alternatively or cumulatively the following enhancements of procedure and construction may be implemented.

The task of the invention is also fulfilled by a method for thermoforming a foil into a container, especially a container used as a brewing capsule, in particular a coffee capsule, where the foil is formed with a plug assist, and gauge pressure, into a blank with a cavity towards the main bearing, within a forming chamber part of a forming tool, characterized in that the foil, during and/or after thermoforming under gauge pressure, is pushed towards the forming floor of the forming chamber part by a calibration element of the plug assist, in order to at least partially affect the floor of the blank as well.

This further allows an even more precise design of material distribution of the blank. In particular, a designated punctuation area on the blank may be manipulated even better by an additional calibration element on the plug assist if the designated punctuation area has already been prestretched by the plug assist and also affected by any gauge pressure processes and is then pressed on the forming floor of the forming chamber part by the calibration element.

This additional pressing process of the foil position of the blank allows a very smooth and equal distribution of the wall side with a precisely defined wall strength.

Further the pressing process effected by the additional calibration element allows even more material distribution of the foil position.

The present task is fulfilled in a procedural perspective with a further aspect of the invention also in a method of thermoforming a foil into a container, especially a container used as a brewing capsule, in particular a coffee capsule, where the foil is formed with a plug assist, and gauge pressure, into a blank with a cavity towards the main bearing, within a forming chamber part of a forming tool, characterized in that a forming floor of the forming chamber, under gauge pressure in the cavity of the blank, at least partially moves towards the axial main bearing, in order to create an annual gap at the forming floor, and the foil affected by a calibration element, during and/or after thermoforming during gauge pressure, is additionally pushed towards the forming floor area of the forming chamber part, in order to manipulate the floor of the blank at least partially.

If during the forming process of the foil or the foil element, an additional creation of an annular gap is desired, as previously described in detail, material distribution of the foil of the blank can be manipulated even better.

In particular, with regard to the previously mentioned method, it is feasible, for the foil to experience an additional calibration stroke along the axial main bearing by the additional calibration element, which occurs during or after a hollow floor forming stroke towards the main bearing by an ejector element in the forming floor. This allows an even better manipulation of the floor of the blank.

Here, a calibration stroke and a hollow floor forming stroke can occur consecutively.

Or, the calibration stroke and the hollow floor forming stroke initiate consecutively, but share at least some time during the process.

It is further possible, that a previously performed hollow floor forming stroke may be reduced in its effect on the blank by a consecutive calibration stroke while the ejector element is pushed back by the calibration element.

Advantageously, the hollow floor stroke occurs with a stroke length of less than 5 mm or less than 3 mm, preferably less than 2 mm or less, towards the axial main bearing.

Conveniently, the calibration stroke is less than 15 mm, preferably less than 10 mm, along the axial main bearing, which is enough in length, for the calibration element to leave the plug assist and manipulate the foil.

A particularly preferred variant of this method comprises the foil being pressed towards the forming floor of the forming chamber part, during and/or after gauge pressure forming, by the additional calibration element, in order to manipulate a designated punctuation area at the floor of the blank, and thus the final container. As previously mentioned, an operationally very safely working punctuation are, on a brewing capsule or coffee capsule, can be produced.

It is further advantageous, if a calibration stroke of the additional calibration element in axial main bearing and/or a hollow forming stroke of an ejector element of the forming floor create a first material peak in a wall or above the circumferential base at the floor of the blank. This first designated material peak allows a first desirable stiffening of the container, which results in a particularly well operating capsule body.

The local material peak can result in a very good stiffening of the capsule body, if it is radially further outside of the circumferential base on a side wall of the blank.

Cumulatively or alternatively it is very useful for a good stiffening, if a calibration stroke of the additional calibration element along axial main bearing and/or a hollow forming stroke of an ejector element in the forming floor create a second material peak at another wall lying radially further towards the center of the floor of the blank, at another circumferential base.

Insofar a favorable variant of this method is the creation of a second local material peak radially further inside at a circumferential base, in particular at a designated punctuation area, on the floor of the blank.

The task for the invention is further solved by a forming tool or thermoforming tool for forming a foil into a container, especially a container used as a brewing capsule, in particular a coffee capsule, with a plug assist and a forming chamber part, which can be put under gauge pressure, where the plug assist can be applied along axial main bearing, where at least one outer plug assist element of the plug assist is actively movable relative to another inner plug assist element and/or vice versa, and between the plug assist elements a movable calibration element exists, which is movable relative to the plug assist elements, in order to press the foil towards a forming floor of the forming chamber part, after a gauge pressure forming. This allows a manifold material distribution with different local material peaks in the blank's wall.

Also, only one plug assist element and the calibration element may be present.

Insofar, the task of the invention is alternatively already solved by a respective forming tool or thermoforming tool with only one outer, or one inner, plug assist element and the corresponding calibration element.

The task for the invention is further solved by a forming tool or thermoforming tool for forming a foil into a container, especially a container used as a brewing capsule, in particular a coffee capsule, with a plug assist and a forming chamber part, which can be put under gauge pressure, where the plug assist can be applied along axial main bearing, where at least one outer plug assist element of the plug assist is actively movable relative to another inner plug assist element and/or vice versa, and between the plug assist elements a movable calibration element exists, which is movable relative to the plug assist elements, in order to press the foil towards a forming floor of the forming chamber part, after a gauge pressure forming, and a forming floor of the forming chamber part exists which possesses an ejector element which may be exerted towards the main bearing into the forming chamber part and which is circumferenced by a stationary floor ring element. This allows an even more manifold material distribution with different local material peaks in the blank's wall.

Here, only one plug assist element and the corresponding additional calibration element may be present.

Insofar, the task of the invention is already solved by the corresponding forming tool or thermoforming tool with only one outer, or only one inner, plug assist element, one calibration element as well as one ejector element in relation to the invention.

The forming tool or thermoforming tool may have a very compact constructive design, if the calibration element has a ring like shape which at least partially surrounds the main body of the plug assist. If the calibration element is further movable into the forming chamber than the plug assist elements, especially the main construction height of the plug assist may be held low.

The task of the invention is further fulfilled by an installation for thermoforming with a forming tool for deep drawing, especially a thermoforming tool for thermoforming, a foil into a container with gauge pressure, and the installation is distinguished by a forming tool or thermoforming tool according to the previously described characteristica.

A particularly favoured variant comprises a control unit/module for creating an annular gap at the forming floor of the forming tool respectively thermoforming tool, while the forming floor experiences gauge pressure. This control unit/module allows any desired annular gap at the forming floor.

It is especially useful if the annular gap can be manipulated with a control unit/module. In particular different annular gap heights allow multiple desired material distributions on the floor part of the blank or the produced container.

It is further useful, if the control unit/module affects a movement of an additional calibration element of a plug assist of the forming tool respectively thermoforming tool, especially in dependence of a hollow forming stroke. This enables a stable operation of even complex thermoforming processes. Also, the installation allows the production of very favourable capsule bodies, as previously described.

The task of the invention is further fulfilled by capsule body with a hollow floor comprising a centrical center area and a radially further outside lying circumferential base, where the hollow floor may possess different material thicknesses from the center line towards radially further outside lying areas, and further the center area and the circumferential base have a thicker material strength than the punctuation area between them. This set up allows a very high structural strength and significant material savings.

The task of the invention is further fulfilled by a brewing capsule, in particular a coffee capsule, with a capsule body with a hollow floor comprising a centrical center area and a radially further outside lying circumferential base, where the hollow floor may possess different material thicknesses from the center line towards radially further outside lying areas, and further the center area and the circumferential base have a thicker material strength than the punctuation area between them. This set up allows a very high structural strength of the capsule body, e.g a brewing capsule respectively a coffee capsule, and significant material savings.

A preferred variant of this method comprises a center area including an inner disk like area, which is distinguished by a decreasing material thickness towards the radial end. Only this characteristic alone allows a significant material saving on a capsule body respectively brewing capsule, meaning a mass product like brewing capsules and in particular coffee capsules experience a significant material reduction.

The task is also fulfilled by an alternative capsule body, in particular a brewing capsule, like a coffee capsule, and the capsule body distinguished by a material peak at the wall of the body and above a circumferential base located at the floor of a capsule body.

Rather usefully, this first material peak is located radially further outside of the circumferential base on a wall of the capsule body.

The first local material peak possesses a material strength of preferably 400 µm or less.

The rest of the side wall has a preferred material strength of 200 µm to 250 µm, which may occur above and below the first material peak.

The circumferential base is preferably at the radially outside lying end of the floor part of the capsule body, distinguished by radially outside transition into the side wall of the capsule body and a radially inside transition into a punctuation area of the capsule body.

The side wall extends towards the axial center line of the capsule body, while the punctuation area is rather orthogonal towards this axial center line.

The circumferential base transits preferably in a curve into the vertical side wall as well as into the rather horizontally aligned punctuation area.

Cumulatively or alternatively it is of further use for the enhanced material stiffening of the capsule body, if at the radially further inside lying circumferential base a second local material peak exists.

This second local material peak is preferably at the punctuation area.

The second local material peak, thus at least partially the punctuation area, is distinguished by a material strength of 300 µm to 350 µm.

A significantly improved variant of the capsule body, in relation to the state of the art, envisages a first local material peak of 400 µm at the side area and a second material peak at the punctuation area of 300 µm to 350 µm.

Advantageously, the previously described material peaks and the previously described methods and installations are always reproducible, in order to guarantee a constant product quality.

Naturally, any of the described characteristica previously described, and respectively described in the claims, may be combined in any way desired, in order to combine any of the described effects and benefits.

Further characteristica, effects and advantages of the present invention are explained in attached figures and the following descriptions, which give an example and description for a forming tool as well as a coffee capsule produced with the tool.

Components, which may be equal in terms of their function, may be given the same reference. However, not all components in the figures need to be referenced and/or described.

The FIGS. 1 to 8 show a forming tool which is a thermoforming tool 1 of an installation 2 (only shown in FIG. 1) for thermoforming a container 3 (see FIGS. 7 and 9) for a coffee capsule 4, where container 3 forms the actual capsule body 5 for a coffee (not shown) load. This capsule body 5 is made from a foil 6 consisting of a thermoplastic material. Foil 6 is formed using thermoforming tool 1.

The thermoforming tool 1 consists mainly of a lower tool part 7 and axially aligned tool part 8, above tool part 7.

The lower tool part 7 is distinguished by a reception area 9 for a forming chamber part 10, where foil 6 is formed. Foil 6 is clamped above the forming chamber part 10 at foil level 11 between the lower tool part 7 and the upper tool part 8 in a standard fashion after the foil 6 is moved on the axial center line 12 of the thermoforming tool 1 from a radially outside lying position, towards the transport bearing 13.

The forming chamber part 10 is aligned along an axial center line 12 of the thermoforming tool 1, adjustable in height on a forming chamber mount 16, where forming chamber height is carried out by a distance ring 17, which is located at the reception room 18 between forming chamber part 10 and forming chamber mount 16, and also located at an upper shoulder 19 of the forming chamber 10 and a lower shoulder 20 of the forming chamber mount 16.

The forming chamber part 10 possesses a forming chamber 25, into which the foil 6 is concurrently formed into a blank 26 (see FIGS. 2 to 6).

The forming chamber 25 is enclosed by a forming floor 27 and a form side wall 28 and is distinguished by a main entry 29.

The forming floor 27 is comprised of, relative to the axial center line 12, a radially further inside lying disk like area 30 and a circumferential ring like area 31.

The radially further inside lying disk like area 30 comprises a movable ejector element 35, which is movably suspended along axial center line 12 on the forming chamber part 10.

Insofar, forming floor 27 includes the movable ejector element 35.

The movable ejector element 35 is single pieced, meaning it realises a closed radially further inside lying disk like are 30, ensuring the forming floor 27 is a plane contact surface (not referenced) for the foil.

Figure 7:
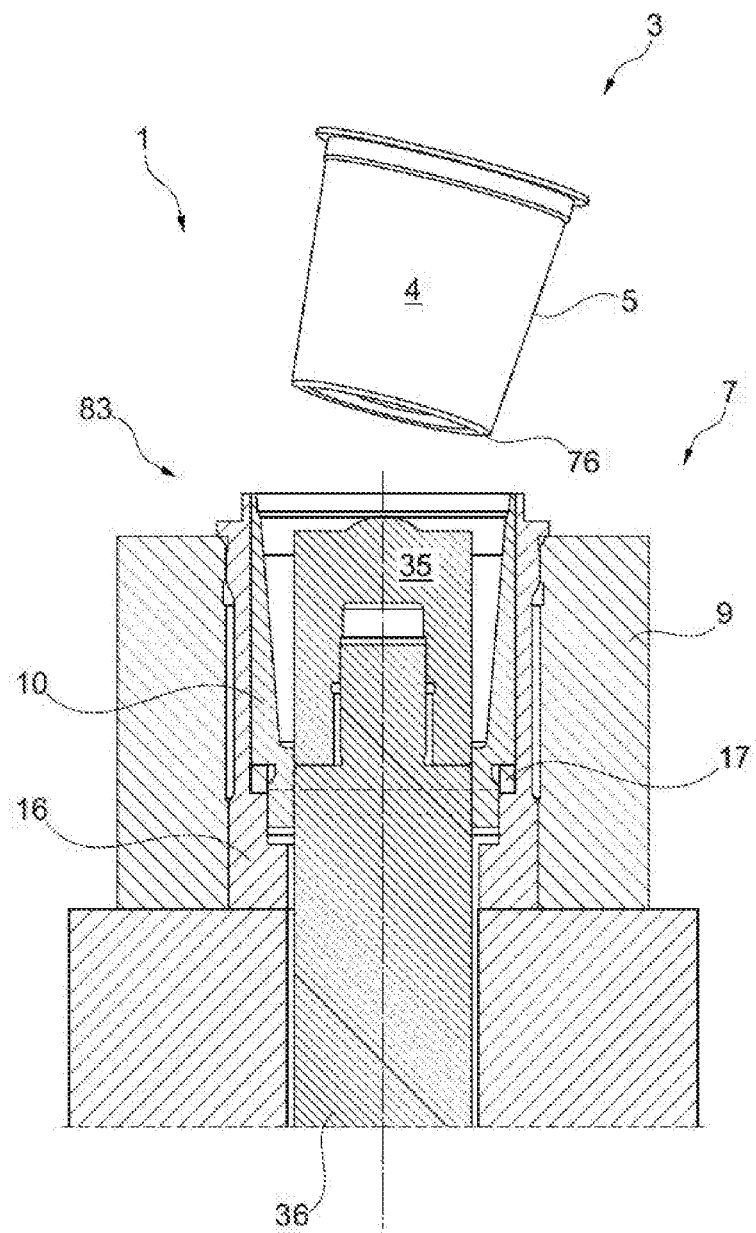
FIG. 7 is a schematic fifth sectional part of the forming tool displayed in FIGS. 1 to 4 in an ejecting position.

The movable ejector element 35 is installed on an ejector rod 36, which is located at the lower forming tool part 8 and which may be moved along the axial center line 12 in order to eject the finished container 3 out of forming chamber 10 (see FIG. 7).

The radially further outside lying ring like area 31 is constructed through a stationary floor ring element 40, which is constructively, in a very simple manner, embodied by a necking (not referenced) of the forming wall 28.

In other words, the stationary floor ring element 40 and thus the radially further outside lying ring like area 31 are enclosed by side wall 28.

The radially further outside lying ring like are 31 respectively the stationary floor ring element 40 are directly transited into a corner respectively transitional area 43 and then into an axially upwards side wall section 44 of the forming side wall 28.

The movable ejector element 35 has a smaller diameter than the forming floor 27, as the forming floor is comprised of both, the ejector element 35 and also the stationary floor ring element 40.

In this variant, the ejector element 35 has a convex shaped dish 46 at its head part, in order to form the blank 26.

Further, the upper tool part 8 exhibits a plug assist 50, which can be applied for stretching or pre-stretching foil 6 along axial main bearing 51, through foil level 11, and then forming or stretching foil 6 into forming chamber 25.

Further, the upper tool part 8 comprises a down holder 54, which allows to clamp foil 6 into foil level 11 against clamping edge 55 of forming chamber part 10. Down holder 54 is movable along axial center line 12 in order to produce a foil or release it.

In order to form foil 6 into blank 27 and eventually into the finished container 3, upper tool part 8 possesses not displayed pressure entries and channels, which enable a gauge pressure on thermoforming tool 1. For this, installation 2 comprises a gauge pressure unit 56 and further a control unit/module 57 which allows control of the thermoforming tool according to the present invention.

The presently described construction demands that thermoforming tool 1 is designed to create an annular gap at forming floor 27 into which the foil may be formed. For this, thermoforming tool 1 may be controlled as followingly described.

According to FIG. 1, thermoforming tool 1 is on a pre-forming position during which foil 6 is located at foil level 11 between the lower tool part 7 and the upper tool part 8. Plug assist 50 is at its initial position 62 above foil level 11. In this foil pre-forming position the annular gap 60 does not yet exist in thermoforming tool 1 in terms of the invention as disk like area 30 and ring like area 31 are still at the same height, or plane.

Insofar the movable ejector element 35 and the stationary floor ring element 40, excepting the convexly shaped dish 46, represent an initially plane forming floor 27 of the forming chamber 25.

Figure 2:
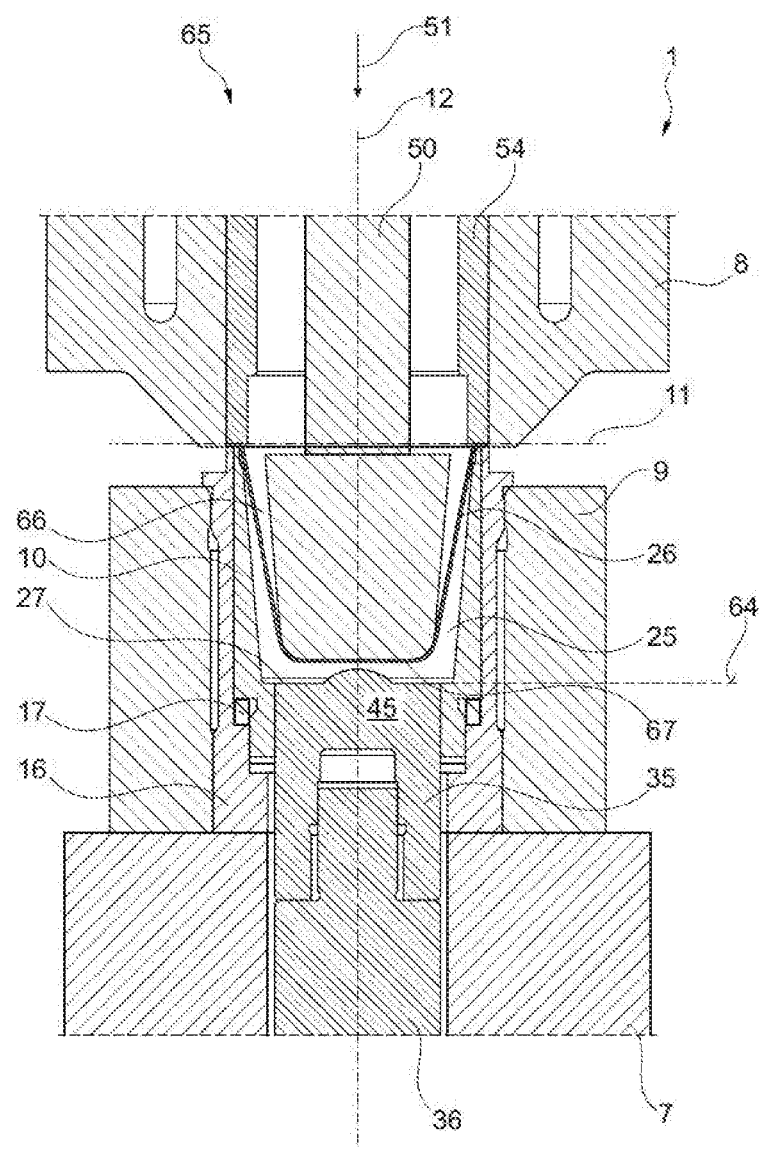
FIG. 2 is a second schematic sectional part of the thermoforming tool displayed in FIG. 2, in a foil pre-stretching position with the foil already stretched into the forming chamber.

According to FIG. 2, thermoforming tool 1 is in a pre-stretching position 65, in which plug assist 50 is already lowered along axial main bearing 51 through foil level 11, forming foil 6 into blank 26 with a cavity 66 within forming chamber 25 of forming chamber part 10. This may occur with or without applied gauge pressure. Already, cavity 66 of blank 26 and the concurrent container 3 are recognisable. Also, there is still no annular gap existing during foil pre-stretch position 65 in thermoforming tool 1.

In order to further enhance floor 67 of blank 26 in a first step with forming floor 27 of forming chamber part 10, a gauge pressure within cavity 66 of blank 26 is applied, in order to expand foil 6 against forming floor 27 and form side wall 28.

Figure 3:
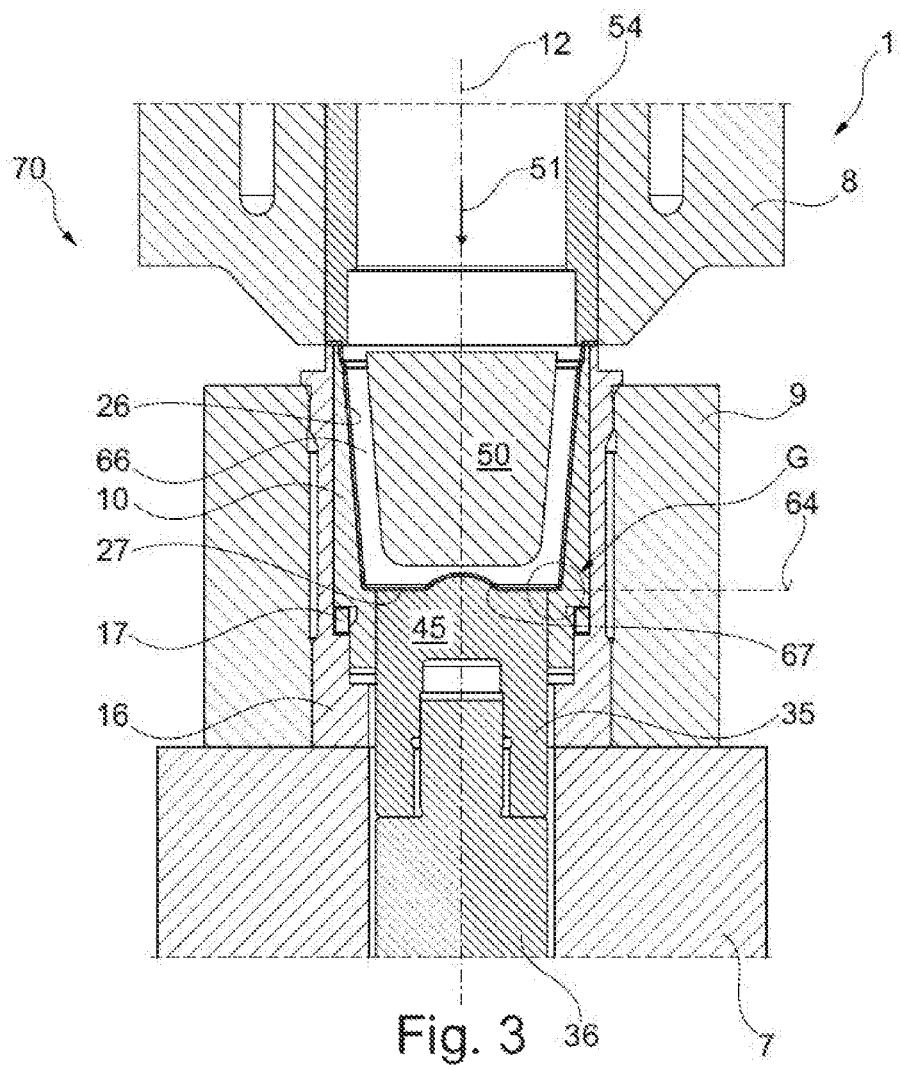
FIG. 3 is a schematic third sectional part of the thermoforming tool displayed in FIGS. 1 and 2, in a gauge pressure position with a foil formed against the forming floor of the forming chamber.
Figure 4:
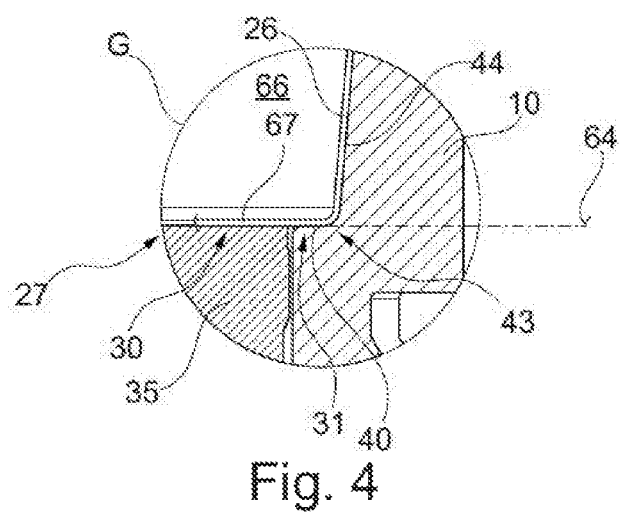
FIG. 4 is a schematic detailed figure of a corner respectively transitional area between the forming floor and a side wall of the forming chamber.

According to FIGS. 3 and 4 thermoforming tool 1 is in a gauge pressure position 70, with a blank 26 formed against forming floor 27 of forming chamber part 10. In this gauge pressure position of thermoforming tool 1, no annular gap 60 exists in terms of the invention, as disk like area 30 and ring like area 31 are still at the same height 60, as is especially seen in FIG. 4.

Figure 5:
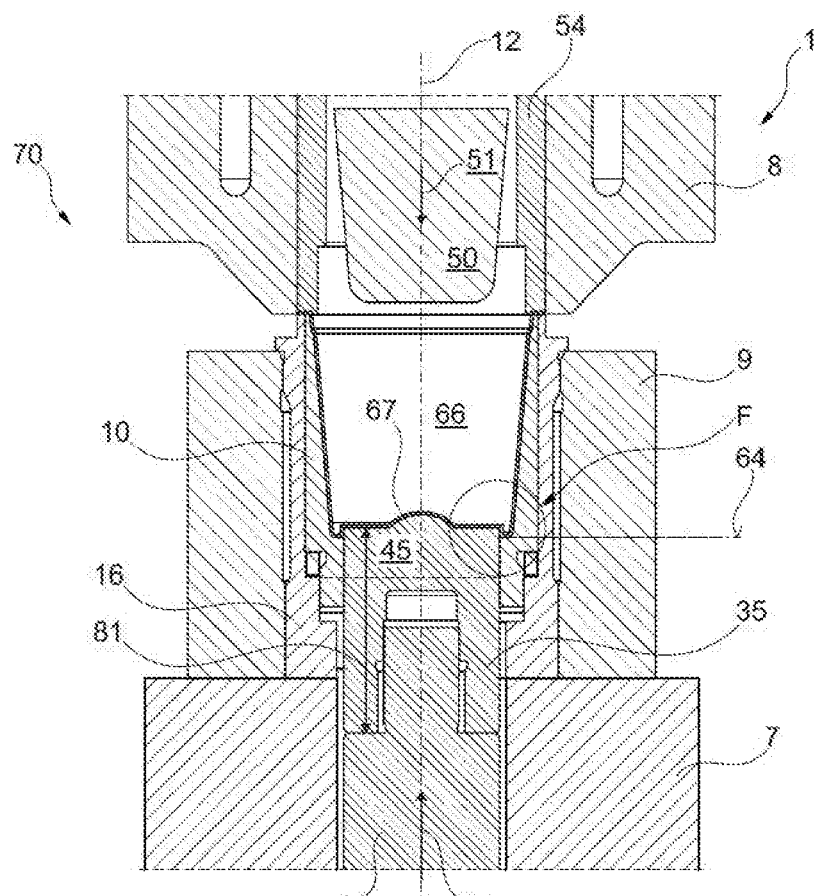
FIG. 5 is a schematic fourth sectional part of the thermoforming tool displayed in FIGS. 1 to 4, in a final forming position with a hollow floor forming stroke towards the gauge pressure.
Figure 6:
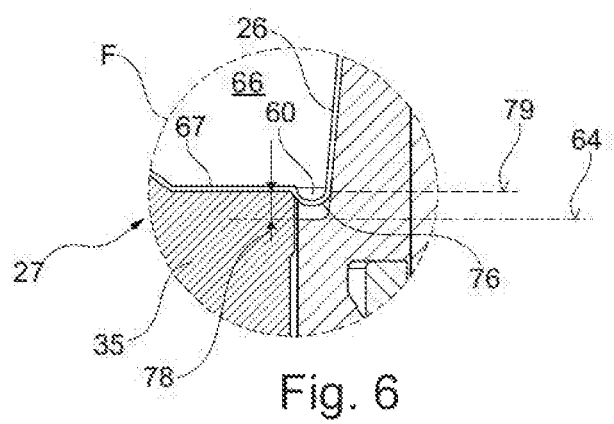
FIG. 6 is a schematic detail of an annual gap created by a hollow floor stroke at the corner respectively transitional area between forming floor and side wall of the forming chamber part.

Only during a second forming step according to FIGS. 5 and 6 annular gap 60 is created at forming floor 27 of forming chamber 10, as in this variant of procedure the movable ejector element 35 is moved, under gauge pressure in cavity 66 of blank 26 with an initial movement towards axial main bearing 51 creating a hollow forming stroke 71. This then results in a hollow floor 73 at the floor area 67 of the blank respectively later finished container 3.

Plug assist 50 is displayed in a retired position.

With this hollow floor forming stroke 71 in combination with a gauge pressure in cavity 66 of blank 26 a material distribution respectively material shift is realised on foil 6 at floor area 67 of blank 26 so that different floor thicknesses can be created (see FIG. 9).

Also, annular gap 76 is created at floor 67, which further stabilises the final container 3 respectively capsule body 5.

Further, the created circumferential base may be used cumulatively or alternatively as a pedestal 77 for container 3 respectively capsule body 5.

In order to create annular gap 60 a stroke height 78 of the movable ejector element 35 of less than 5 mm is sufficient, although stroke 78 in this example only has a height of 2 mm.

The present stroke height 78 is to be egalised with the resulting annular gap height (not referenced).

Now, the disk like area 30 of forming floor 27, represented by movable ejector element 35, is on a new height level 79 after creating annular gap 60, as the ring like area 31 remained at forming floor 27 and initial height level 64 due to stationary floor ring element 40.

The hollow floor forming stroke 71 is initiated by the previously mentioned control unit/module 57 for example, and previously dependant on the gauge pressure within cavity 66 of blank 26. But other driving systems are possible to initiate the stroke 71.

According to FIGS. 5 and 6, thermoforming tool 1 is in a final forming position 80, in which a temporary forming edge (not referenced) is created, at blank 27, through annular gap 60, around which the foil can be formed.

The movable ejector element 35 has a component thickness 81, which is at least the same height, or higher, as annular gap height 78 of annular gap 60.

According to FIG. 7, thermoforming tool 1 is in ejector position 83, during which the finished container 3 is being ejected from thermoforming tool 1. Movable ejector element 35 is still moved into forming chamber 25 with ejector rod 36.

Concurrently, thermoforming tool 1 is moved into pre-stretching position 61, as seen in FIG. 1, in order to form a new container 3.

Figure 8:
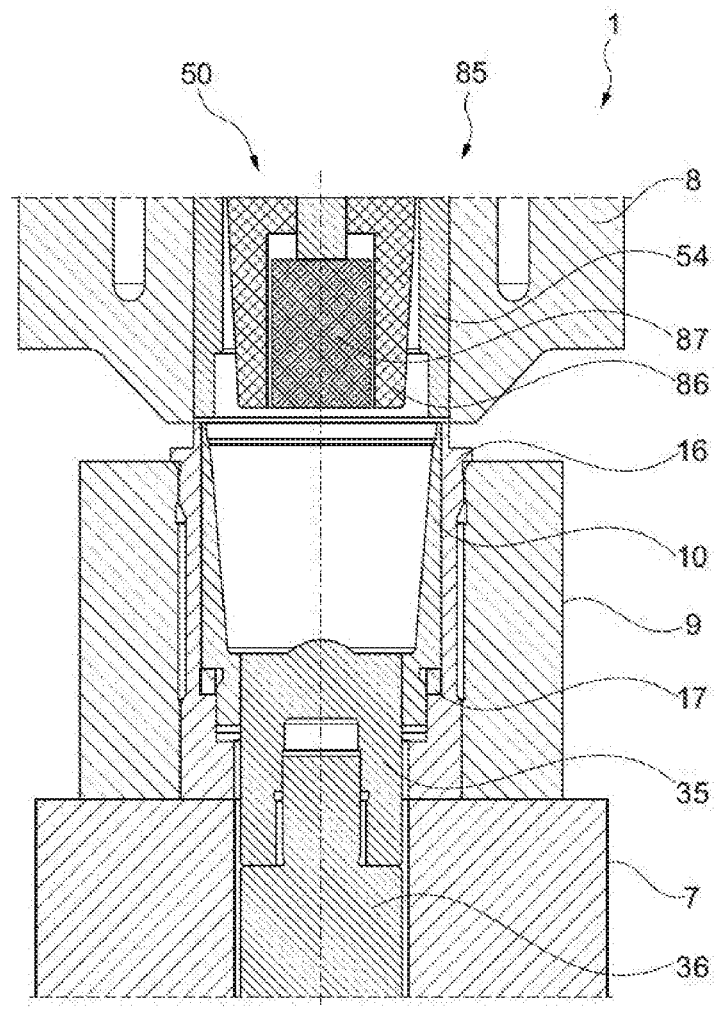
FIG. 8 is a schematic sectional part of the thermoforming tool in an alternative variant with a double plug assist, where the plug assist elements are also usable as additional calibration elements.

According to FIG. 8, thermoforming tool 1 is shown in an alternative set up 85. Here plug assist 50 is split in two parts comprising an outer pre-stretch punch 86 and an inner pre-stretch punch 87.

Especially outer pre-stretch punch 86 can alternatively or cumulatively represent an additional calibration element in terms of the invention, which will now be further discusses.

Besides this, thermoforming tool 1 is identical with previously described characteristics.

Using the present thermoforming tool 1 and the corresponding method for thermoforming, forming a blank 26 respectively a container 3 is feasible, as is shown in FIG. 9, also displaying a material spread with a local material peak 88 of foil 6 and circumferential base 76.

Here the forming floor 67 of blank 26 respectively container 3 displays a radially inside lying floor disk area 90 with a first floor thickness 91.

Accompanying is a radially further outside lying, first floor ring area 92 with a second floor thickness 93 and a radially even further outside lying second floor ring area 94 with a third floor thickness 95.

All floor thicknesses 91, 93, 95 are formed in dependance to the gauge pressure applied in cavity 66 of blank 26 at forming floor 27 of thermoforming tool 1 and the concurrent appearance of annular gap 60.

Using the radially inside lying floor disk area 90, a dished, thicker middle area 96 at floor area 67 of blank 26 is created.

Further, using the radially further outside lying, first floor ring area 92 material saving is accomplished, by creating a thinner punctuation area 97 between the radially inside lying disk like area 90 and the radially even further outside lying second floor ring element 94.

Also, using the radially even further outside lying, second floor ring area 94, circumferential base 76 is created at floor 67 of blank 26.

It is well reconisable, that at the center of radially inside lying floor disk area 90 component thickness 91 is nearly the same as foil thickness 98 at sealing edge 99 of container 3 and then decreases towards the radially outside lying area. Except for thickness of floor part thickness 93 of the radially further outside lying, first floor ring area 92.

Second component thickness 93 stays nearly the same towards its radial edge further outside, but increases after radially further outside lying second floor ring area 94 with its third floor thickness 95, concluding in a local material peak 88 at circumferential base 76.

Figure 10:
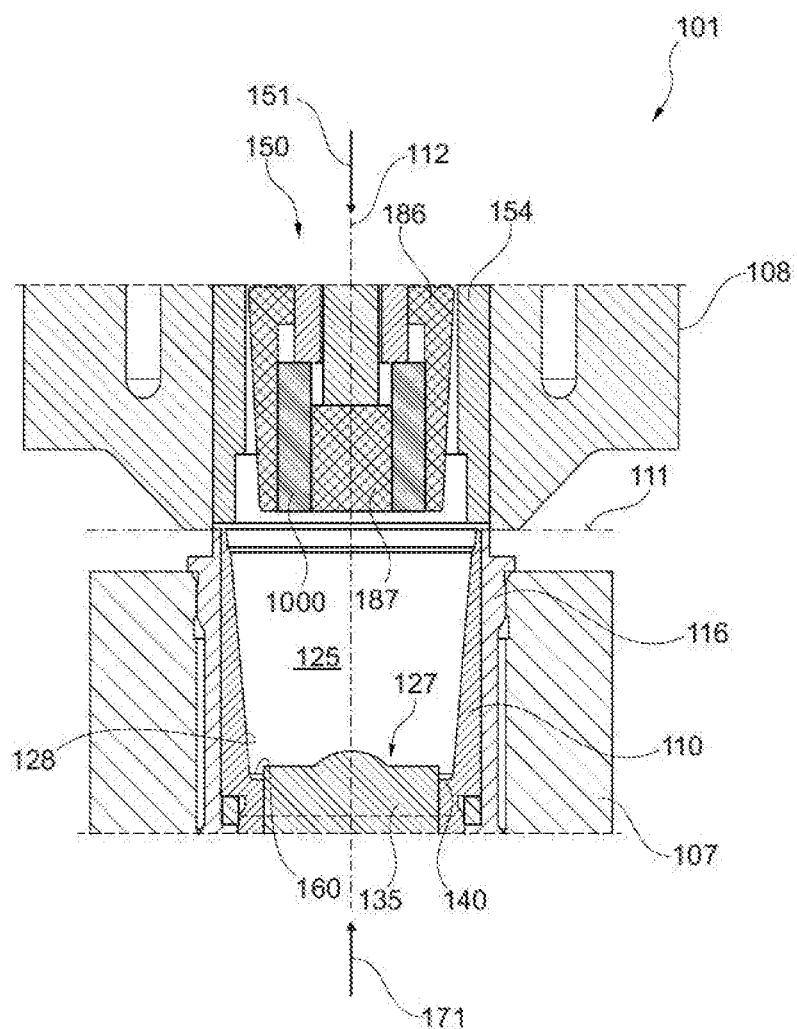
FIG. 10 is a schematic sectional part of another thermoforming tool comprising a multi functional forming stroke with two pre stretching punch elements and a calibration element and a multi functional floor.

According to FIG. 10, a further variant is thermoforming tool 101, at least in terms of the present invention. It displays a lower tool part 107 and an upper tool part 108, which are movable along an axial center line 112 towards a foil level 111, in order to form a foil (not shown) at foil level 111, in particular between forming chamber part 110 respectively a forming chamber mount 116 of the lower tool part 107 and a down holder 154 of upper tool part 108, and clamp it.

Upper tool part 108 comprises a further plug assist 150, which may be moved along axial main bearing 151 through foil level 111 into forming chamber 125 of forming chamber part 110.

Plug assist 150 is a multi functional plug assist (not referenced) with an outer plug assist element 186 respectively pre-stretch element, an inner plug assist element 187 respectively pre-stretch element and an additional calibration element 1000. This enables an additional pressing of a floor area (not referenced) of a blank (not referenced) in forming chamber 125 towards a forming floor 127 respectively a movable ejector element 135 of forming floor 127. This allows an even more precise manipulation of a foil at the floor area, in particular the creation of a calibrated punctuation area (see FIGS. 14 to 21) on the blank respectively a produced capsule body.

This, in terms of the present invention, calibrated punctuation area, is distinguished through a floor area thickness of 300 µm up to 350 µm, guaranteeing a very good operationability of the capsule body.

All plug assist elements 186 and 187 are movable relative to each other and individually towards the additional calibration element 1000, in particular along axial main bearing 151. Further, the additional calibration element 1000 is individually movable relative to plug assists 186 and 187.

Driving mechanisms for operating plug assists 186, 187 and also additional calibration element 1000 are not further discussed. The mechanisms are well known and can be applied here.

Forming floor 127 of forming chamber 110 is a multi functional forming floor (not referenced), comprising a movable ejector element 135 and a concentrically arranged floor ring element 140.

While the stationary floor ring element 140 is bound downwards by a form side wall 128 of forming chamber 110 onto forming chamber 110, the movable ejector element 135 may be exerting a hollow floor forming stroke 171 towards axial main bearing 151.

This hollow floor forming stroke 171 may interactively produce annular gap 160 during the forming process, preferably during gauge pressure in the cavity of the blank, also under maximum gauge pressure, affecting a procedural material spread of, or on, the foil in an additional way.

A hollow floor forming stroke 171 in terms of the invention, needs a stroke of less than 5 mm and more than 0.5 mm towards the main axial bearing 151.

Regarding further, not discussed, details of thermoforming tools 101 construction, FIGS. 1 to 8 and 14 to 21 are referred, in order to avoid any repeating.

Upper tool part 208 displayed in FIG. 11, belonging to thermoforming tool 201, possesses a multitude of multi functional plug assists 250 (referenced exemplary), which each have an outer plug assist element 286 respectively outer pre-stretch punch, an inner plug assist element 287 respectively inner pre-stretch punch and an additional calibration element 1000.

FIG. 11 displays inner plug assist elements 287 extend axially beyond both, the outer plug assist elements 286 as well as the additional calibration elements 1000.

Additional calibration elements 1000 extend beyond outer plug assist elements 286, but are, relative to the inner plug assist elements 287, axially reclined.

Naturally, all plug assist elements 286, 287 and calibration elements 1000 are almost indefinably arrangeable relative to each other.

According to FIGS. 12 and 13 a further container 303 of a coffee capsule, not shown, respectively capsule body 305, and its material distribution in its walls 1010, represents a very good stiffening of the capsule body.

Capsule body 305 has a local material peak 388 in a lower area 1012 of side wall 1013 of capsule body 305 and directly above circumferencing base 376, which is located radially outside on the floor area 367 of capsule body 305.

Circumferencing base 376 is again single walled with foil 306, which capsule body 305 comprises.

Circumferential base 376 is formed in such a way, that two wall sections 1016 and 1017 are side by side, but separated by distance 1018. Distance 1018 in variant has approximately 2 mm.

In other words, both wall sections 1016 and 1017 of circumferential base 376 are contactlessly facing each other.

Overall, capsule body 305 possesses a wall run 1020, which runs from seal edge 399 of capsule body 305 along an axial center line 312 downwards along radial direction 1022 radially further inside towards axial center line 312, with an almost same material strength of appr. 200 µm up to 250 µm, until 5 mm above the circumferential base 376 the local material peak 388 of more than 400 µm occurs.

Axially further downwards the first local material peak 388 bends the wall 1010 with a reduced material strength with the radially outside lying wall section 1016 of circumferential base 376 at appr. 90° towards ist radial inside.

From there the wall 1010 moves from a radially outside lying wall section 1016 into an approximately horizontal radially further inside lying inside wall section 1025 of circumferential base 376, and concurrently wall 1010 bends towards radially further inside lying wall section 1017 as wall as in axial direction 1021 upwards and also in radial direction 1022, further radially inside.

Wall section 1017, and 1025 of circumferential base 376 show a material strength of less than 300 µm and preferably more than 200 µm up to 250 µm, whereby the wall section 1016 have a material strength of more than 300 µm, preferably of 400 µm.

Wall 1010 bends from the inner wall section 1017 of circumferential base 376 radially further inside into a generally horizontal punctuation area 397 of capsule body 305, where a further local material peak 1030 with a material thickness of 300 µm up to 350 µm exists.

This further material peak 1030 gives punctuation area 397 an extraordinary good stability for a favored punctuation during use of capsule body 305.

Material strength of wall 1010 decreases after punctuation area 397 towards the radial inside, until wall 1010 extends radially upwards into a dished thicker center area 396.

From center line 312 the previously described wall run 1020 is mirrored back to seal edge 399.

The presently described wall run 1020 gives capsule body 305 an excellent structural stability and stiffening. Making use of capsule body 305 very reliable and safe.

According to FIGS. 14 to 21 a further procedure for producing a container respectively capsule body (not referenced) of a coffee capsule (not referenced) explains, in a similar fashion to the previously described alternative thermoforming tool 401, construction of thermoforming tool 101, also displayed in FIG. 10.

Alternative thermoforming tool 401 is located, according to FIG. 14, in an opened position 1035, in which lower tool part 407 and upper tool part 408 are separated individually from a foil level 411, in order foil 406 can easily access thermoforming tool 401.

For opening and closing thermoforming tool 401, both tool parts 407 and 408 can be moved along an axial center line 412 in an appropriate manner.

Figure 16:
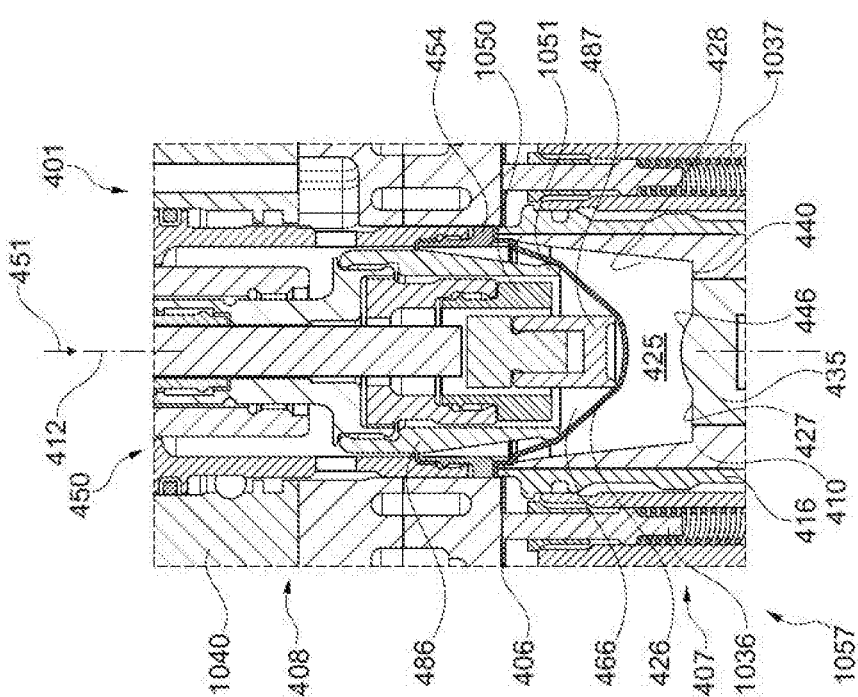
FIG. 16 is a schematic of a third sectional display of the thermoforming tool from FIGS. 14 and 15 in a first foil pre-stretching position with a multi functional plug assist already inserted into the forming chamber of the thermoforming tool.

Lower tool part 407 is distinguished through forming chamber part 410, which possesses forming chamber 425, in which foil 406 can be formed into a blank 426 (see FIG. 16).

Forming chamber 425 is open at its side facing upper tool part 408 and enclosed by a forming floor 427 and a forming side wall 428.

Forming floor 427 comprises a movable floor ejector element 435 and a concentrically arranged stationary floor ring element 440.

Forming chamber part 410 ist changeably mounted in a forming chamber mount 416 of lower tool part 407.

In relation to axial center line 412 a radially further outside lying, from forming chamber part 410, a spring mounted exterior clamping ring 1036 for clamping the foil 406 facing the upper tool part 407, as seen in FIG. 15.

Forming chamber mount 416, with its forming chamber part 410 and concurrent mechanics (not referenced) of exterior clamping ring 1036 are mounted in a lower frame part 1037 of thermoforming tool 401.

Upper tool part 408 of thermoforming tool 401 possesses therefore an upper frame part 1040, towards which exterior clamping ring 1036 can work for clamping foil 406.

Upper frame part 1040 comprises a further plug assist 450, which is a multi functional plug assist (not referenced), mounted on upper tool part 408, including a down holder 454.

Plug assist 450 is distinguished by an outer plug assist element 486, a radially further inside lying, inner plug assist element 487 and an additional calibration element.

Here plug assist elements 486, 487 and the additional calibration element 1050 are movable, together as plug assist 450 and individually, along axial center line 412.

In other words, plug assist elements 186 and 187 are, relative to each other, axially movable, and the additional calibration element 1050 is axially movable relative to both plug assist elements 186 and 187.

Opened position 1035 (FIG. 14) of thermoforming tool 401 comprises an additional calibration element 1050 fully retired within outer plug assist element 486. It even retires beyond lower edge 1051 of outer plug assist element 186.

Contrary, inner plug assist element 486 at least partially extends beyond lower edge 1051 of outer plug assist element 186.

Insofar, inner plug assist element 487 extends at least partially beyond additional calibration element 1050.

According to FIG. 15, thermoforming tool 401 is displayed in closed position 1055, in which lower tool part 407 and upper tool part 408 are moved along axial center line 412, in order that foil 406 is clamped between upper frame part 1040 with exterior clamp ring 1036 and lower frame part 407 with down holder 454 and forming chamber part mount 416 respectively forming chamber part 410.

Thus, forming chamber 425 of forming chamber part 410 is driven from below towards foil level 411 (see FIG. 15) and plug assist 450 with its inner plug assist element 487 is driven from above towards foil level 411.

According to FIG. 16, thermoforming tool 401 is in a first foil pre-stretching position 1057, in which plug assist 450, along axial main bearing 451, is at least partially driven through foil level 411 (see FIG. 14) and further into the forming chamber 425, and foil 406 is already pre-formed into blank 426 with a cavity 466.

Here, plug assist 450 is moved in its entirety along axial main bearing 451. This means plug assist elements 486, 487 and additional calibration element 1050 have not yet been displaced relative to each other.

Figure 17:
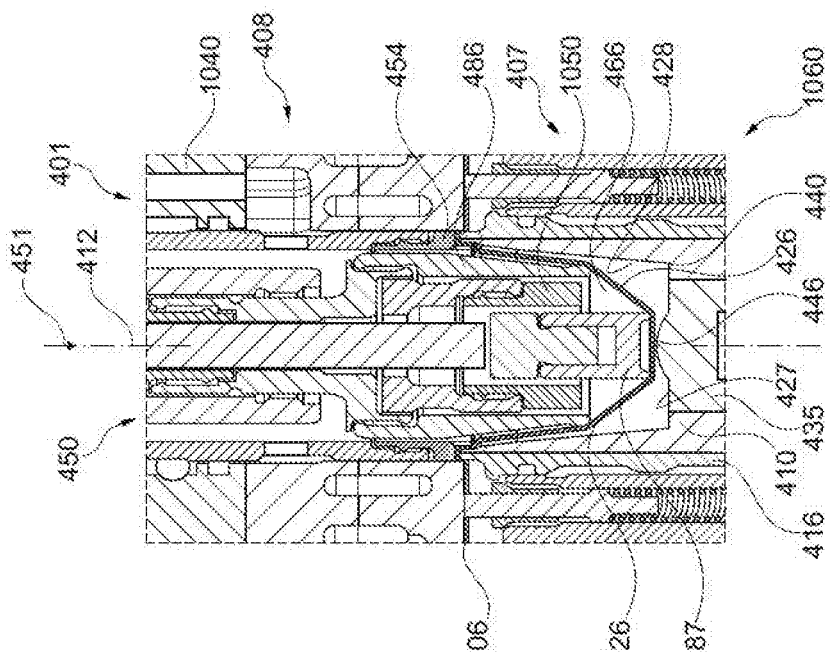
FIG. 17 is a schematic of a fourth sectional view of the thermoforming tool displayed in FIGS. 14 to 16 in a second pre-stretching position with a plug assist from the multi functional plug assist at its furthest extension into the forming chamber.

According to FIG. 17, thermoforming tool 401 is in a second pre-stretching position 1060, where plug assist 450 is driven even further into forming chamber 425 along axial main bearing 451, especially until upper plug assist element 487 approaches or fully touches convex dish area 446 of forming floor 427.

Depending on blank 426, inner plug assist element 487 may already be extended along main axial bearing 451, relative to outer plug assist element 486 respectively to additional calibration element 1050. This remains an option.

According to FIG. 18, thermoforming tool 401 is in a third foil pre-stretching position 1065, in which both, plug assist 486 and additional calibration element 1050, are moved further along axial main bearing 451 and thus further into forming chamber 425.

Here, outer plug assist element 486 and additional calibration element 1050 are moved along axial main bearing 451, relative to inner plug assist element 487, so that blank 426 is showing at the height of the highest rise (not referenced) of the convex dish area 446 a plane surface.

In order to apply an enhanced stiffening of blank 426 respectively container 403, in particular capsule body 405 (see FIG. 21), beyond the current state, which can be applied through a designated material spread within wall 1067 (see FIG. 21) of blank 426, and also create a circumferential base 476 at blank 426, annular gap 460 is created at forming floor 427 of forming chamber part 410, where foil 406 respectively floor area 467 of blank 426 is formed into using gauge pressure within the cavity 466 of blank 426.

The interactively created annular gap 460 in this particular variant is created with ejector element 435 exerting a hollow floor stroke 471 towards main bearing 451, in order for annular gap 460 to appear between axially rising side wall 428 and movable ejector element 435.

Preferably, hollow floor stroke 471 is performed, while cavity 466 of blank 426 experiences gauge pressure, enabling a favourable material spread within wall 1067 of blank 426.

Thus FIG. 19 shows a thermoforming tool 401 during a hollow floor forming stroke 1070 under gauge pressure.

According to further examples in FIG. 20 thermoforming tool 401 is shown in a calibration position 1075, in which the additional calibration element 1050 is further moved along axial main bearing towards forming floor 427 and even presses against ejector element 435 enabling a very precise punctuation area 497 at forming floor 467 of blank 426 which transits radially further inside into circumferential base 476.

Here, additional calibration element 1050 exerted, relative to plug assist elements 186 and 187, along axial main bearing 451 a calibration stroke 1076.

Thus, foil 406 respectively blank 426 is formed into container 403 respectively capsule container 405 of a not further defined coffee capsule.

Using thermoforming tool 401, seen in FIGS. 14 to 21, and the concurrently described thermoforming process, a material distribution on blank 426 respectively container 403, in particular capsule body 405.

According to FIG. 21, thermoforming tool 401 is displayed with a produced container 403 from blank 426. The plug assist 450 is fully retreated above foil level 411.

Finally, an ejector stroke (not referenced, similar in FIG. 7) is performed with ejector element 435, as soon as thermoforming tool 401 is opened sufficiently for the finished container 403 to leave thermoforming tool 401.

Figure 22:
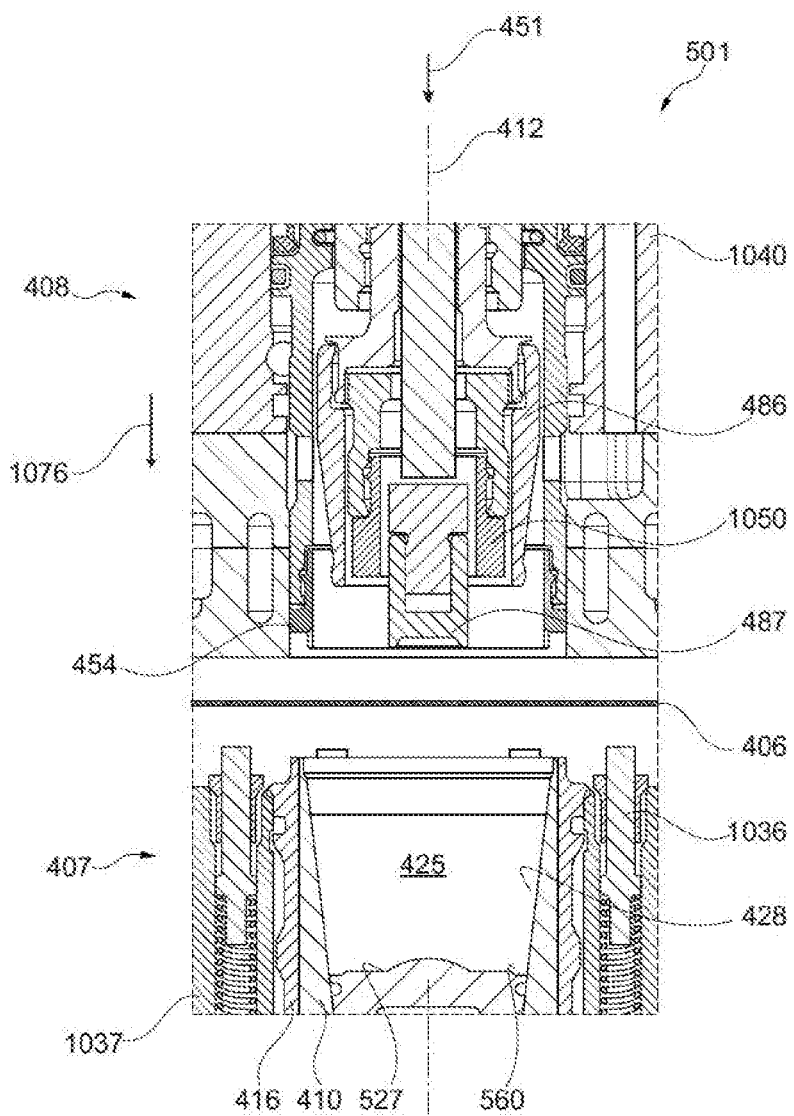
FIG. 22 is a schematic of a further sectional display of the thermoforming tool shown in FIGS. 14 to 21 with an alternative forming floor with a permanent circumferential annular gap.

Another alternative thermoforming tool 501 is displayed in FIG. 22. It shows a similar construction to thermoforming tool 401 (seen in FIGS. 14 to 21), except for an alternative forming floor 527.

Therefore the constructional design and functionality of thermoforming tool 401 are referred to, in order to describe thermoforming tool 501 and avoid any repetitions. Thus same references have been used for equal components of thermoforming tool 401.

Contrary to forming floor 427 of thermoforming tool 401, alternative forming floor 527 possesses a stationary annular gap 560, saving the additional step of creating annular gap 460 at gauge pressure.

Here it may be explicitly noted, that any characteristic of the previous description and/or claims may be combined in any desired way to combine and accomplish the effects, characteristics and advantages cumulatively or alternatively.

Naturally, the previously mentioned procedural variants are only first designs of the invention. Insofar, embodiment of the invention is not restricted to these variants.

All described characteristics in the application are essential to the invention as long as they are new in relation to the state of art, either on their own or in any possible combination.

REFERENCES 1 forming tool respectively thermoforming tool
2 installation for thermoforming
3 container
4 coffee capsule
5 capsule body
6 foil
7 lower tool part
8 upper tool part
9 intake
10 forming chamber part
11 foil level
12 axial center line
13 transport bearing
16 forming chamber mount
17 distance ring element
18 intake
19 upper shoulder
20 lower shoulder
25 forming chamber
26 blank
27 forming floor
28 forming side wall
29 main entry opening
30 disk like face
31 circular face
35 movable ejector rod
36 ejector rod
40 stationary annular gap element
43 Corner—respectively transitional zone
45 head side
46 convex shaped section 50 plug assist
51 axial main bearing
54 hold down device
55 upper clamping edge
56 gauge pressure unit
57 control unit/module
60 interactively producible annular gap respectively circumferential gap
61 foil pre-forming position
62 upper starting position
64 height level
65 foil pre-stretch position
66 cavity
67 floor section
70 gauge pressure forming position
71 hollow floor forming stroke
73 hollow floor
75 floor section
76 circumferential base
77 pedestal
78 stroke height respectively annular gap height
79 different height
80 finished forming position
81 component thickness
83 ejection position
85 alternative equipment
86 outer pre-stretch punch respectively calibration element
87 inner pre stretch punch
88 local material peak
90 radially inside lying floor disc section
91 first floor thickness
92 radially further outside lying first annular gap
93 second floor thickness
94 radially further outside lying second annular gap
95 third floor thickness
96 dished, thicker center section
97 thinner punctuation section
98 foil thickness
99 barring edge
101 thermoforming tool
107 lower tool half
108 upper tool half
110 forming chamber part
111 foil level
112 axial center line
125 forming chamber
127 forming floor
128 forming side wall
135 movable ejector element
140 stationary floor ring element
151 axial main forming bearing
154 hold down device
150 plug assist respectively multi-functional plug assist
160 circumferential annular gap
171 hollow floor forming stroke
186 outer plug assist element respectively outer pre-stretch element
187 inner plug assist element respectively inner pre-stretch element
201 thermoforming tool
208 upper tool half
250 plug assist respectively multi-functional plug assist
286 outer plug assist element
287 inner plug assist element
303 further container
305 capsule body
306 foil
312 axial center line
367 floor section
376 circumferential base
388 first local material peak
396 dished, thicker middle section
397 puncturing section
399 barring edge
401 alternative thermoforming tool
403 container
405 capsule body
406 foil
407 lower tool half
408 upper tool half
410 forming chamber part
411 foil level
412 axial center line
416 forming chamber part -retainer
425 forming chamber
426 blank
427 forming floor
428 forming side wall
435 movable ejector element
440 stationary floor ring element
446 convex body space
450 plug assist respectively multifunctional plug assist
451 axial main forming bearing
454 hold down device
460 interactively producible annular gap respectively circumferential gap
466 cavity
467 floor section
471 hollow floor forming stroke
476 circumferential base
486 outer plug assist element respectively outer pre-stretch element
487 inner plug assist element respectively inner pre-stretch element
501 alternative thermoforming tool
527 alternative forming tool
560 permanent circumferential annular gap
1000 additional calibration element
1010 wall
1012 lower section
1013 side wall
1016 radially outside wall section
1017 radially centric wall section
1018 clearance
1020 wall run
1021 axial direction
1022 radial direction
1025 bridge wall section
1030 further local material peak
1035 opened position
1036 outer clamping ring
1037 lower body part
1040 upper body part
1050 additional calibration element
1051 lower edge
1055 closed position
1057 first foil pre-stretch position
1060 second pre stretch position
1065 third pre stretch position
1067 wall
1070 hollow floor plug assist position
1075 calibration position
1076 calibration stroke

The invention claimed is:

1. A forming tool for deep drawing a foil into a container, the forming tool comprising:
- a forming chamber part configured to be loaded with pressure, the forming chamber part defining a forming chamber, the forming chamber part having an axial center axis that extends through the forming chamber, the forming chamber part including:
  - a forming floor having a disk shaped area and a circumferential ring shaped area disposed radially outward, relative to the axial center axis, of the disk shaped area;
  - a side wall, the forming floor and the side wall bounding the forming chamber such that pressure can form the foil into the container;
  - a floor ring element defining the ring shaped area of the forming floor;
  - an ejector element directly adjacent the floor ring element and movable relative to the floor ring element, the ejector element defining the disk shaped area of the forming floor, the ejector element movable between an initial position and a gap forming position, wherein in the initial position the forming chamber is free of an annular gap and wherein in the gap forming position the forming chamber includes the annular gap, the annular gap having a base, an inner side, and an outer side opposing the inner side and disposed radially outward, relative to the axial center axis, of the inner side, the inner and outer sides each extending generally upward from the base, the ejector element defining the inner side of the gap, the side wall defining the outer side of the gap, and the floor ring element defining the base of the gap, wherein the ejector element moves along the axial center axis from the initial position to the gap forming position to create the annular gap into which the foil can be formed in combination with pressure creating a hollow bottom at a bottom of the container, wherein the movement of the ejector element toward the gap forming position is adapted to cause a material re-distribution or material shift in the foil in a bottom area so that different bottom thickness areas will be created in the container, wherein the annular gap is arranged to provide a circumferential base of the container; and
- a control unit that regulates movement of the ejector element in dependence of a hollow floor forming stroke, wherein the control unit is equipped to initiate the hollow floor forming stroke under consideration of the gauge pressure.

2. The forming tool according to claim 1, wherein the forming tool is a thermoforming tool for thermoforming the foil into the container.

3. The forming tool according to claim 1, wherein the floor ring element and the side wall are a single piece.

4. The forming tool according to claim 1, wherein the ejector element has a smaller diameter than the forming floor.

5. The forming tool according to claim 1, wherein the ejector element possesses a component thickness which is at least equal to or greater than a gap height of the annular gap.

6. The forming tool according to claim 1, wherein the ejector element is a single piece.

7. The forming tool according to claim 1, wherein the ejector element is at least partially guided by the floor ring element.

8. The forming tool according to claim 1, wherein the ejector element has a convex dish at its head part extending into the forming chamber.

9. The forming tool according to claim 1, wherein the forming chamber part has an adjustable height relative to the ejector element and one forming chamber mount.

10. The forming tool according to claim 1, wherein different annular gap heights are adjustable using different distance ring elements, where at least one distance ring element is located in a reception room between the forming chamber part and a forming chamber mount.

11. An installation for thermoforming with a forming tool for deep drawing or a thermoforming tool for thermoforming, a foil into a container with a pressure unit, the forming tool or thermoforming tool comprising:
- a forming chamber part configured to be loaded with pressure, the forming chamber part defining a forming chamber, the forming chamber part having an axial center axis that extends through the forming chamber, the forming chamber part including:
  - a forming floor having a disk shaped area and a circumferential ring shaped area disposed radially outward, relative to the axial center axis, of the disk shaped area;
  - a side wall, the forming floor and the side wall bounding the forming chamber such that pressure can form the foil into the container;
  - a floor ring element defining the ring shaped area of the forming floor; and
  - an ejector element movable relative to the floor ring element, the ejector element defining the disk shaped area of the forming floor, the ejector element movable between an initial position and a gap forming position, wherein in the initial position the forming chamber is free of an annular gap and wherein in the gap forming position the forming chamber includes an annular gap, wherein the ejector element moves along the axial center axis form the initial position to the gap forming position under pressure at the forming floor to create the annular gap into which the foil can be formed in combination with pressure; and
- a plug assist movable along the axial center axis, the plug assist including an outer plug assist element and an inner plug assist element, the outer plug assist element disposed radially outward of, relative to the axial center axis, the inner plug assist element, the outer and inner plug assist elements being adjustable relative to one another, the plug assist including a calibration element disposed between the outer and inner plug assist elements, the calibration element is movable relative to the outer and inner plug assist elements, the calibration element being configured to move towards the disk shaped area of the forming floor defined by the ejector element in order to press the foil.

12. The forming tool according to claim 1, wherein the container is a brewing capsule or a coffee capsule.

13. The forming tool according to claim 10, wherein the at least one distance ring element is located in the reception room between an upper shoulder of the forming chamber part and a lower shoulder of the forming chamber mount.

14. The forming tool according to claim 11, further comprising a control unit that regulates the movement of the ejector element.

15. An installation for thermoforming with a forming tool for deep drawing or a thermoforming tool for thermoforming, a foil into a container with a pressure unit, the forming tool or thermoforming tool comprising:

a forming chamber part configured to be loaded with pressure, the forming chamber part defining a forming chamber, the forming chamber part having an axial center axis that extends through the forming chamber, the forming chamber part including:
- a forming floor having a disk shaped area and a circumferential ring shaped area disposed radially outward, relative to the axial center axis, of the disk shaped area as a floor ring element defining the ring shaped area of the forming floor;
- a side wall having a circumferential inner surface extending generally upward from the ring shaped area of the forming floor, the forming floor and the inner surface of the side wall bounding the forming chamber such that pressure can form the foil into the container;
- an ejector element directly adjacent the floor ring element and movable relative to a floor ring element, the ejector element defining the disk shaped area of the forming floor, the ejector element movable between an initial position and a gap forming position, wherein in the initial position the forming chamber is free of an annular gap and wherein in the gap forming position the forming chamber includes the annular gap, wherein the ejector element moves along the axial center axis from the initial position to the gap forming position to create the annular gap into which the foil can be formed in combination with pressure creating a hollow bottom at a bottom of the container, wherein the movement of the ejector element toward the gap forming position is adapted to cause a material re-distribution or material shift in the foil in a bottom area so that different bottom thickness areas will be created in the container, wherein the annular gap is arranged to provide a circumferential base of the container; and
- a control unit that regulates movement of the ejector element in dependence of a hollow floor forming stroke, wherein the control unit is equipped to initiate the hollow floor forming stroke under consideration of the gauge pressure.

16. The forming tool according to claim 1, wherein the ejector element moves along the axial center axis from the initial position to the gap forming position under pressure at the forming floor, and wherein the annular gap is arranged to provide the circumferential base of the container formed through a curved foil part of the foil comprising two foil sections, where on a cross-section the two foil sections face each other at a distance with no contact.

17. The forming tool according to claim 1, wherein, in the initial position, an outer portion of the disk shaped area of the forming floor is generally horizontally aligned with the ring shaped area of the forming floor.

18. The forming tool according to claim 1, wherein the ring shaped area defines the base of the annular gap.

19. The forming tool according to claim 1, wherein, in the initial position, the ring shaped area extends between and interconnects the disk shaped area of the forming floor and the side wall.

20. The forming tool or thermoforming tool according to claim 15, wherein the ejector element moves along the axial center axis from the initial position to the gap forming position under pressure at the forming floor, and wherein the annular gap is arranged to provide the circumferential base of the container formed through a curved foil part of the foil comprising two foil sections, where on a cross-section the two foil sections face each other at a distance with no contact.

* * * * *